United States Patent
Taguchi et al.

(10) Patent No.: US 7,444,483 B2
(45) Date of Patent: Oct. 28, 2008

(54) MANAGEMENT APPARATUS, MANAGEMENT METHOD AND STORAGE MANAGEMENT SYSTEM

(75) Inventors: Yuichi Taguchi, Sagamihara (JP); Fumi Miyazaki, Fujisawa (JP); Masayuki Yamamoto, Sagamihara (JP); Yasunori Kaneda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 305 days.

(21) Appl. No.: 11/261,773

(22) Filed: Oct. 31, 2005

(65) Prior Publication Data

US 2007/0061512 A1   Mar. 15, 2007

(30) Foreign Application Priority Data

Sep. 13, 2005 (JP) ............................. 2005-264718

(51) Int. Cl.
- G06F 12/00 (2006.01)
- G06F 13/00 (2006.01)
- G06F 13/28 (2006.01)

(52) U.S. Cl. ..................... 711/156; 711/112; 711/114
(58) Field of Classification Search ............. 711/156, 711/114, 112
See application file for complete search history.

(56) References Cited

U.S. PATENT DOCUMENTS

| | | | |
|---|---|---|---|
| 6,584,545 B2 * | 6/2003 | Bachmat et al. | 711/114 |
| 6,587,956 B1 * | 7/2003 | Hiratsuka et al. | 713/500 |
| 6,714,016 B2 * | 3/2004 | Odaohhara et al. | 324/427 |
| 6,717,434 B2 * | 4/2004 | Takahashi et al. | 326/37 |
| 6,732,241 B2 * | 5/2004 | Riedel | 711/154 |
| 6,738,861 B2 * | 5/2004 | Lawrence | 711/106 |
| 2003/0236102 A1 * | 12/2003 | Kawai et al. | 455/550.1 |
| 2004/0044914 A1 * | 3/2004 | Gedeon | 713/300 |
| 2004/0054939 A1 | 3/2004 | Guha et al. | |
| 2004/0139476 A1 * | 7/2004 | Bacon et al. | 725/120 |
| 2004/0153263 A1 * | 8/2004 | Holle | 702/60 |

\* cited by examiner

Primary Examiner—Tuan V. Thai
Assistant Examiner—Christopher D Birkhimer
(74) Attorney, Agent, or Firm—Reed Smith LLP; Stanley P. Fisher, Esq.; Juan Carlos A. Marquez, Esq.

(57) ABSTRACT

A management apparatus, a management method, and a storage management system that more specifically manage power consumption, making it easy to analyze problems relating to power consumption or properly relocate data are provided.

A power consumption for each of a plurality of memory apparatus groups each consisting of a plurality of memory apparatuses in a storage system is computed based on a performance for each of a plurality of logical storage extents defined in a plurality of storage extents provided by each of the memory apparatus groups, and a value of the power consumption for each of one or more of the memory apparatus groups obtained by the computation is output together with information on an access status of each of the corresponding logical storage extents.

13 Claims, 28 Drawing Sheets

FIG.6

| RAID GROUP IDENTIFICATION INFORMATION 11021 | RAID GROUP LOGICAL STORAGE CAPACITY 11022 | RAID LEVEL 11023 | MAGNETIC MEMORY APPARATUS IDENTIFICATION INFORMATION 11024 | MAGNETIC MEMORY APPARATUS PHYSICAL STORAGE CAPACITY 11025 | MAGNETIC MEMORY APPARATUS POWER SPECIFICATION 11026 |
|---|---|---|---|---|---|
| RG#0 | 900GB | RAID5 3D+1P | hd#0 | 300GB | 0.6KW/h |
|  |  |  | hd#1 | 300GB | 0.6KW/h |
|  |  |  | hd#2 | 300GB | 0.6KW/h |
|  |  |  | hd#3 | 300GB | 0.6KW/h |
| RG#1 | 900GB | RAID5 3D+1P | hd#4 | 300GB | 0.6KW/h |
|  |  |  | hd#5 | 300GB | 0.6KW/h |
|  |  |  | hd#6 | 300GB | 0.6KW/h |
|  |  |  | hd#7 | 300GB | 0.6KW/h |
| RG#2 | 438GB | RAID5 3D+1P | hd#8 | 146GB | 0.6KW/h |
|  |  |  | hd#9 | 146GB | 0.6KW/h |
|  |  |  | hd#10 | 146GB | 0.6KW/h |
|  |  |  | hd#11 | 146GB | 0.6KW/h |
| ... | ... | ... | ... | ... | ... |

| RAID GROUP IDENTIFICATION INFORMATION | LOGICAL STORAGE AREA IDENTIFICATION INFORMATION | LOGICAL STORAGE AREA LOGICAL STORAGE CAPACITY |
|---|---|---|
| RG#0 | LDEV#0 | 400GB |
| | LDEV#1 | 250GB |
| | LDEV#2 | 250GB |
| RG#1 | LDEV#3 | 300GB |
| | LDEV#4 | 300GB |
| | LDEV#5 | 300GB |
| RG#3 | LDEV#6 | 120GB |
| ... | ... | ... |

| DATA INPUT/OUTPUT COMMUNICATION INTERFACE | LOGICAL VOLUME NUMBER | LOGICAL STORAGE AREA IDENTIFICATION INFORMATION | CONNECTABLE COMPUTER APPARATUS IDENTIFICATION INFORMATION |
|---|---|---|---|
| NIF#0 | LUN#10 | LDEV#0 | 50:00:01A3:9E:03:00:00 |
|  | LUN#11 | LDEV#1 | 50:00:01A3:9E:03:00:00 |
|  | LUN#12 | LDEV#2 | 50:00:01A3:9E:03:00:10 |
| NIF#1 | LUN#20 | LDEV#0 | 50:00:01A3:9E:03:00:20 |
|  | LUN#21 | LDEV#3 | 50:00:01A3:9E:03:00:20 |
| ... | ... | ... | ... |

| MEASUREMENT START TIME | MEASUREMENT END TIME | LOGICAL STORAGE AREA IDENTIFICATION INFORMATION | NUMBER OF INPUT/OUTPUT REQUESTS | DATA TRANSFER AMOUNT |
|---|---|---|---|---|
| 2005/06/01 0:00 | 2005/06/01 5:59 | LDEV#0 | 700 | 20MB/sec |
| 2005/06/01 0:00 | 2005/06/01 5:59 | LDEV#1 | 900 | 30MB/sec |
| 2005/06/01 0:00 | 2005/06/01 5:59 | LDEV#2 | 300 | 14MB/sec |
| 2005/06/01 0:00 | 2005/06/01 5:59 | LDEV#3 | 995 | 93MB/sec |
| 2005/06/01 0:00 | 2005/06/01 5:59 | LDEV#4 | 90 | 15MB/sec |
| 2005/06/01 0:00 | 2005/06/01 5:59 | LDEV#5 | 18 | 7MB/sec |
| ... | ... | ... | ... | ... |

FIG.10

| MEASUREMENT START TIME (11121) | MEASUREMENT END TIME (11122) | MAGNETIC MEMORY APPARATUS IDENTIFICATION INFORMATION (11123) | MAGNETIC MEMORY APPARATUS OPERATION RATE (11124) |
|---|---|---|---|
| 2005/06/01 0:00 | 2005/06/01 5:59 | hd#0 | 41.67% |
| 2005/06/01 0:00 | 2005/06/01 5:59 | hd#1 | 41.67% |
| 2005/06/01 0:00 | 2005/06/01 5:59 | hd#2 | 41.67% |
| 2005/06/01 0:00 | 2005/06/01 5:59 | hd#3 | 41.67% |
| 2005/06/01 0:00 | 2005/06/01 5:59 | hd#4 | 80% |
| 2005/06/01 0:00 | 2005/06/01 5:59 | hd#5 | 80% |
| 2005/06/01 0:00 | 2005/06/01 5:59 | hd#6 | 80% |
| 2005/06/01 0:00 | 2005/06/01 5:59 | hd#7 | 80% |
| ... | ... | ... | ... |

| | | RAID GROUP OPERATION INFORMATION | | LOGICAL STORAGE EXTENT OPERATION INFORMATION | | |
|---|---|---|---|---|---|---|
| MEASUREMENT START TIME | MEASUREMENT END TIME | IDENTIFICATION INFORMATION | POWER SPECIFICATION | POWER CONSUMPTION | IDENTIFICATION INFORMATION | NUMBER OF INPUT/OUTPUT REQUESTS | DATA TRANSFER AMOUNT |
| 2005/06/01 0:00 | 2005/06/01 5:59 | RG#0 | 2.40KW/h | 1.00KW/h | LDEV#0 | 700 | 20MB/sec |
| | | | | | LDEV#1 | 900 | 30MB/sec |
| | | | | | LDEV#2 | 300 | 14MB/sec |
| 2005/06/01 6:00 | 2005/06/01 11:59 | RG#0 | 2.40KW/h | 1.88KW/h | LDEV#0 | 1000 | 58MB/sec |
| | | | | | LDEV#1 | 2500 | 41MB/sec |
| | | | | | LDEV#2 | 300 | 12MB/sec |
| 2005/06/01 12:00 | 2005/06/01 17:59 | RG#0 | 2.40KW/h | 1.88KW/h | LDEV#0 | 2400 | 28MB/sec |
| | | | | | LDEV#1 | 2000 | 41MB/sec |
| | | | | | LDEV#2 | 300 | 6MB/sec |
| 2005/06/01 18:00 | 2005/06/01 23:59 | RG#0 | 2.40KW/h | 1.00KW/h | LDEV#0 | 700 | 5MB/sec |
| | | | | | LDEV#1 | 600 | 5MB/sec |
| | | | | | LDEV#2 | 300 | 3MB/sec |
| ... | ... | ... | ... | ... | ... | ... | ... |
| 2005/06/01 0:00 | 2005/06/01 23:59 | RG#1 | 2.40KW/h | 1.20KW/h | LDEV#3 | 3980 | 93MB/sec |
| | | | | | LDEV#4 | 360 | 15MB/sec |
| | | | | | LDEV#5 | 70 | 7MB/sec |
| 2005/06/01 0:00 | 2005/06/01 23:59 | RG#3 | 2.40KW/h | 0.48KW/h | LDEV#6 | 1280 | 62MB/sec |
| | | | | | LDEV#7 | 1120 | 58MB/sec |
| | | | | | LDEV#8 | 360 | 18MB/sec |
| ... | ... | ... | ... | ... | ... | ... | ... |

FIG.16

| MIGRATION TARGET LOGICAL STORAGE EXTENT CONDITIONS | | | | | | MIGRATION DESTINATION LOGICAL STORAGE EXTENT CONDITIONS | |
|---|---|---|---|---|---|---|---|
| INPUT/OUTPUT REQUEST CONDITIONS | | DATA TRANSFER AMOUNT CONDITIONS | | POWER CONCENTRATION CONDITIONS | | POWER CONCENTRATION CONDITIONS | |
| INPUT/OUTPUT CONCENTRATION RATE | CONDITIONAL EXPRESSION | DATA TRANSFER AMOUNT | CONDITIONAL EXPRESSION | POWER CONSUMPTION RATE | CONDITIONAL EXPRESSION | POWER CONSUMPTION RATE | CONDITIONAL EXPRESSION |
| 15% | < | n/a | n/a | 55% | > | 55% | < |
| 80% | > | n/a | n/a | 40% | > | 55% | > |
| n/a | n/a | 10MB/sec | < | 40% | < | 10% | < |
| 5% 30% | > < | 100MB/sec | > | 80% | > | 30% | < |

FIG.17

| ANALYSIS START TIME | ANALYSIS END TIME | RAID GROUP OPERATION INFORMATION | | LOGICAL STORAGE EXTENT OPERATION INFORMATION | | | |
|---|---|---|---|---|---|---|---|
| | | IDENTIFICATION INFORMATION | POWER CONSUMPTION RATE | IDENTIFICATION INFORMATION | NUMBER OF INPUT/OUTPUT REQUESTS | INPUT/OUTPUT CONSUMPTION RATE | DATA TRANSFER AMOUNT |
| 2005/06/01 0:00 | 2005/06/01 23:59 | RG#0 | 60% | LDEV#0 | 700 | 40.00% | 27.75MB/s |
| | | | | LDEV#1 | 900 | 50.00% | 29.25MB/s |
| | | | | LDEV#2 | 300 | 10.00% | 8.75MB/s |
| | | RG#1 | 50% | LDEV#3 | 1000 | 90.25% | 93.00MB/s |
| | | | | LDEV#4 | 2500 | 8.16% | 15.00MB/s |
| | | | | LDEV#5 | 300 | 1.59% | 7.00MB/s |
| | | RG#2 | 0% | n/a | 0 | n/a | n/a |
| | | RG#3 | 20% | LDEV#6 | 2000 | 46.38% | 62.00MB/s |
| | | | | LDEV#7 | 300 | 40.58% | 58.00MB/s |
| | | | | LDEV#8 | 700 | 13.04% | 18.00MB/s |
| | | RG#4 | 50% | LDEV#9 | 600 | 100% | 50MB/s |
| ... | | ... | | ... | ... | ... | ... |

MANAGEMENT APPARATUS, MANAGEMENT METHOD AND STORAGE MANAGEMENT SYSTEM

CROSS-REFERENCES TO RELATED APPLICATIONS

This application relates to and claims priority from Japanese Patent Application No. 2005-264718, filed on Sep. 13, 2005, the entire disclosure of which is incorporated herein by reference.

BACKGROUND

1. Field of the Invention

The present invention relates to a management apparatus, a management method, and a storage management system, and specifically relates to a power management technique.

2. Description of the Related Art

A network connecting one or more external memory apparatuses and one or more computers is called a SAN (Storage Area Network). A SAN is a computer system that is used especially frequently for a plurality of computers to share one large capacity memory apparatus. A SAN facilitates easier subsequent addition or deletion of storage capacity or computers, and has the advantage of having superior extensibility.

For an external memory apparatus connected to a SAN, what is called a RAID (Redundant Array of Independent Disks) storage system—which divides data, and writes/reads the divided data in parallel to/from a plurality of magnetic memory apparatuses such as hard disk drives—is commonly used.

Meanwhile, in recent years, a MAID (Massive Array of Inactive Disks) storage system obtained by having a function halting a magnetic memory apparatus under certain conditions to reduce power consumption in a RAID storage system has been suggested, as disclosed in the specification of U.S. Patent No. 2004/0054939.

SUMMARY

Accompanying the recent explosive popularity of the Internet, globalization, and highly-computerized life infrastructure, it is common to have business information equipment supposed to operate for 24 hours a day, every day. However, there is a problem in that the non-interruptible operation of a large computer or large capacity memory apparatus consumes a large amount of power.

One of the techniques developed in light of that problem is the aforementioned MAID. A MAID storage system reduces power consumption by halting any magnetic memory apparatus that is not in use for a certain period of time.

However, in conventional MAID techniques, no attempt has been made to further reduce power consumption by concentrating magnetic memory apparatuses in operation.

Furthermore, in conventional techniques of memory apparatus power management, the power consumption has been measured in terms of an external power supply unit included in the apparatus. Thus, it has not been possible to manage power consumption in units of logical components constituting the memory apparatus. Due to that limitation, it has not been possible to know which part of the apparatus consumes a large or small amount of power.

Similarly, since there has been no means for investigating the relationship between the power consumption and the operation rate or performance for a particular part, it has also not been possible to know the relationship between the effects of a reduction in power consumption and performance deterioration.

Moreover, because of the lack of the above power consumption analysis means, the problem has been that a system configuration can be neither redesigned nor optimized for power consumption reduction.

The present invention has been made with the above points in mind, and an object of the present invention is to provide a management apparatus, a management method and a storage management system, which manage power consumption more specifically, facilitating easier power consumption-related problem analysis and proper data relocation.

In order to achieve the object, the present invention is a management apparatus for managing one or more storage systems that input or output data in response to an input/output request from a host system, including: a computing unit for computing a power consumption for each of a plurality of memory apparatus groups each consisting of a plurality of memory apparatuses in each of the storage systems, based on a performance of each of a plurality of logical storage extents defined in a plurality of storage extents provided by each of the memory apparatus groups; and an output unit for outputting a value of the power consumption for each of one or more of the memory apparatus groups calculated by the computing unit, together with information on an access status of each of the corresponding logical storage extents.

The present invention is also a management method for managing one or more storage systems that input/output data in response to an input/output request from a host system, including: a first step of computing a power consumption for each of a plurality of memory apparatus groups each consisting of a plurality of memory apparatuses in each of the storage systems, based on a performance of each of a plurality of logical storage extents defined in a plurality of storage extents provided by each of the memory apparatus groups; and a second step of outputting a value of the power consumption for each of one or more of the memory apparatus groups calculated by the computation, together with information on an access status of each of the corresponding logical storage extents.

Moreover, the present invention is a storage management system with one or more storage systems having a plurality of memory apparatuses for storing data, and a management apparatus for managing the storage systems, each storage system including a controller for reading/writing data provided by a host system from/to a relevant logical storage extent among a plurality of logical storage extents defined in a plurality of storage extents provided by each of a plurality of memory apparatus groups each consisting of the plurality of memory apparatuses, and transmitting information on a performance and capacity of each of the logical storage extents, the management apparatus including a computing unit for computing a power consumption for each of the memory apparatus groups based on information on the performance for each of the logical storage extents received from the storage system, determining a migration target logical storage extent among the logical storage extents and a migration destination memory apparatus group among the memory apparatus groups, based on the computation result and information on the capacity of each of the logical storage extents received from the storage system, and sending to the storage system a request for migration processing according to the determination, and the controller of the storage system migrating the designated storage extent to the designated memory apparatus group in accordance with the request for migration processing received from the management apparatus.

The present invention makes it possible to manage power consumption not in units of storage systems, but in units of more specific logical storage extents, and to know the relationship between power consumption and logical storage extents, and the relationship between power consumption and performance, facilitating problem analysis as well as data relocation.

BRIEF DESCRIPTION OF THE DRAWINGS

FIG. 6 is a table indicating an example configuration for magnetic memory apparatus configuration information contained in a storage system.

FIG. 7 is a table indicating an example configuration for logical storage extent configuration information contained in a storage system.

FIG. 8 is a table indicating an example configuration for logical storage extent map information contained in a storage system.

FIG. 9 is a table indicating an example configuration for logical storage extent performance information contained in a storage system.

FIG. 10 is a table indicating an example configuration for magnetic memory apparatus performance information contained in a storage system.

FIG. 11 is a table indicating an example configuration for apparatus performance information contained in a management computer.

FIG. 16 is a table indicating an example configuration for migration target logical storage extent condition definition information contained in a management computer.

FIG. 17 is a table indicating an example configuration for apparatus performance analysis information contained in a management computer.

DETAILED DESCRIPTION OF THE PREFERRED EMBODIMENTS

An embodiment of the present invention is described below with reference to the drawings.

Figure 1:
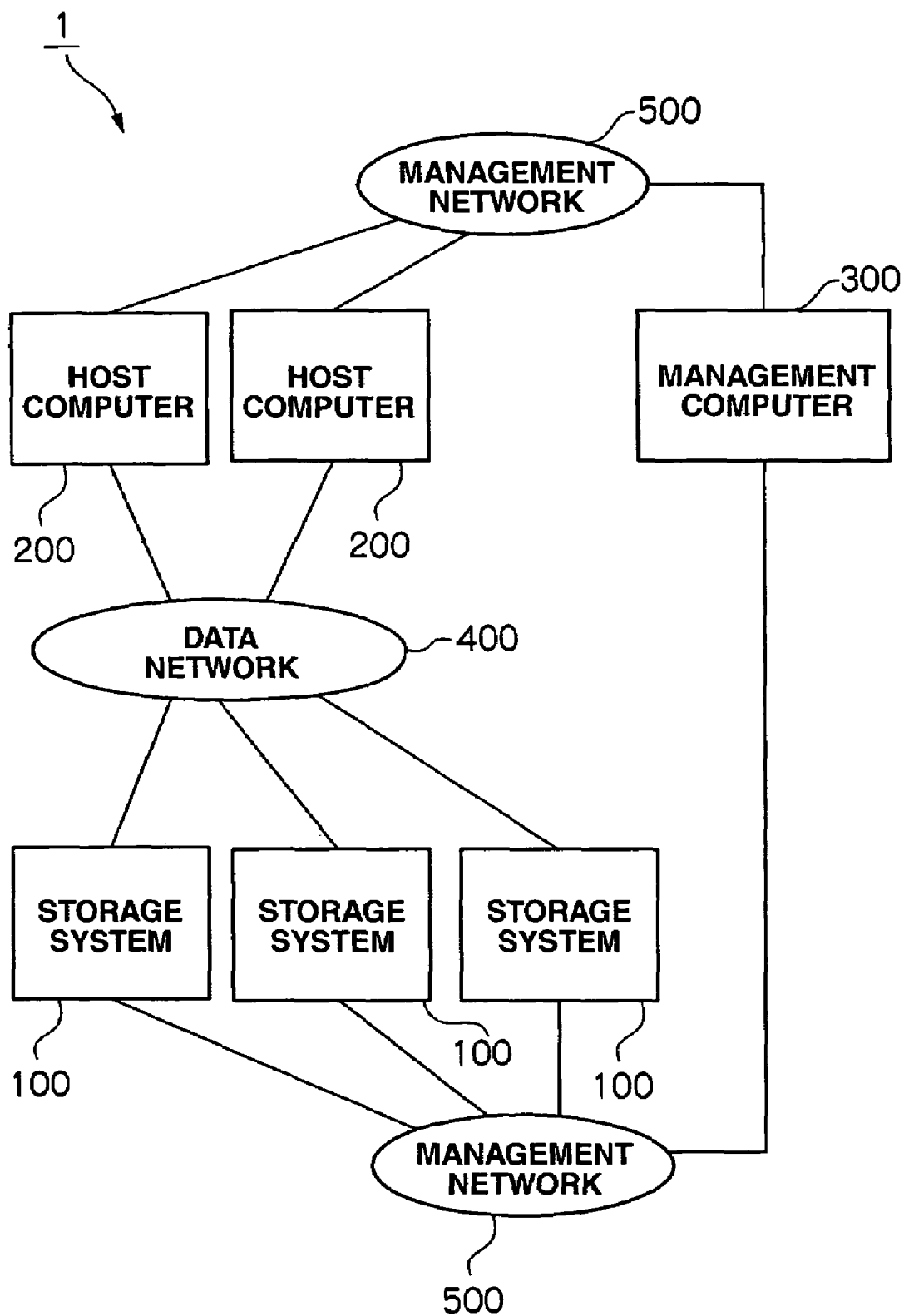
FIG. 1 is a block diagram showing a network system configuration according to an embodiment of the present invention.

In FIG. 1, reference numeral 1 represents a network system according to an embodiment of the present invention as a whole. In the network system 1, host computers 200 are connected to storage systems 100 via a data network 400. The storage systems 100 and host computers 200 of the embodiment are physical apparatuses constituting a network, and the data network 400 indicates a network comprised of one or more connection devices. The data network 400 may be comprised of conventional network connection devices such as fiber channel or Ethernet®. The above configuration enables the host computers 200 and the storage systems 100 to communicate with each other.

The storage system 100 and the host computer 200 are interconnected via a management computer 300, and a management network 500. The management network 500 may use a conventional communication technique, as with the data network 400. In another embodiment, the management network 500, and the data network 400 may not always be independent, but may also share a single network. The above configuration enables the management computer 300 and the storage systems 100, and the management computer 300 and the host computers 200 to communicate with each other.

Figure 2:
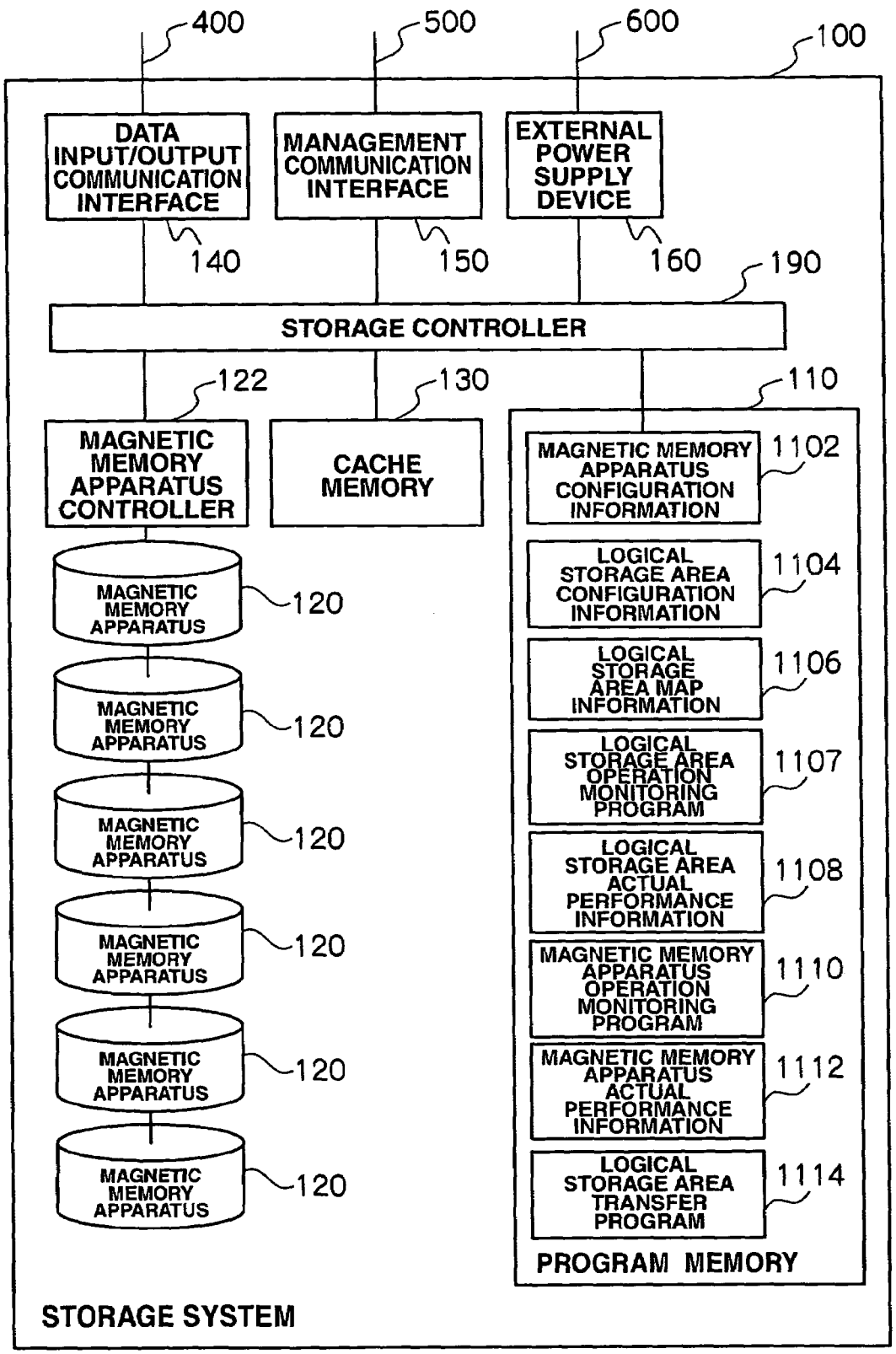
FIG. 2 is a block diagram showing a storage system configuration according to an embodiment of the present invention.

FIG. 2 shows an example configuration for a storage system 100. The storage system 100 has a data input/output interface 140 connected to the data network 400 for data input/output, a management interface 150 connected to the management network 500 for management information input/output, an external power supply unit 160 for externally supplying power to the storage system 100, a storage controller 190 for controlling the storage system, a program memory 110, being a storage extent storing a program necessary for the storage system 100 to operate, a magnetic memory apparatus controller 122, being an apparatus for controlling magnetic memory apparatuses 120, and a cache memory 130, being a temporary storage extent for speeding up data input/output from/to a host computer 200, interconnected via the storage controller 190.

The data input/output communication interface 140 and the management communication interface 150 may use a network input/output device according to conventional communication techniques such as fiber channel or Ethernet®. In this embodiment, the number of data input/output communication interfaces 140, and the number of management communication interfaces 150 is not determined. The management communication interface 150 may not necessarily be an independent one, and the data input/output interface 140 can double as the management communication interface 150 and also be used for management information input/output.

Each magnetic memory apparatus 120 is a memory apparatus consisting of a magnetic disk generally called a hard disk. The magnetic memory apparatus controller 122 controls not only instructions such as those for arm operation relating to the magnetic memory apparatus 120's data reading/writing, but also behaviors such as disk rotation start/stop. In this embodiment, the number and capacity of the magnetic memory apparatuses 120 and the magnetic memory apparatus controllers 122 is not determined.

For the cache memory 130, volatile memory is generally used, but a magnetic memory apparatus may also be used. In this embodiment, the capacity of the cache memory 130 is not determined.

The program memory 110 is memory space using a magnetic memory apparatus 120 or a volatile semiconductor memory, and is used for holding basic programs or information required for the storage system 100 to operate. In the program memory 110, magnetic memory apparatus configuration information 1102, which is configuration information for the magnetic memory apparatus 120, logical storage extent configuration information 1104, which is configuration information for a logical storage extent constituting a unit of logical storage space for storing data, logical storage extent map information 1106, which is information for defining the relationship between the logical storage extent and the host computer 200, a logical storage extent operation monitoring program 1107 for monitoring the data input/output status of the logical storage extent, logical storage extent performance information 1108, which is operation information for the logical storage extent monitored by the logical storage extent operation monitoring program 1107, a magnetic memory apparatus operation monitoring program 1110 for monitoring the operating status of the magnetic memory apparatus 120, magnetic memory apparatus performance information 1112, which is operation information for the magnetic memory apparatus 120 monitored by the magnetic memory apparatus operation monitoring program 1110, and a logical storage extent migration program 1114, which has a function for migrating a logical storage extent from its current magnetic memory apparatus 120 to another magnetic memory apparatus 120 are stored.

Figure 3:
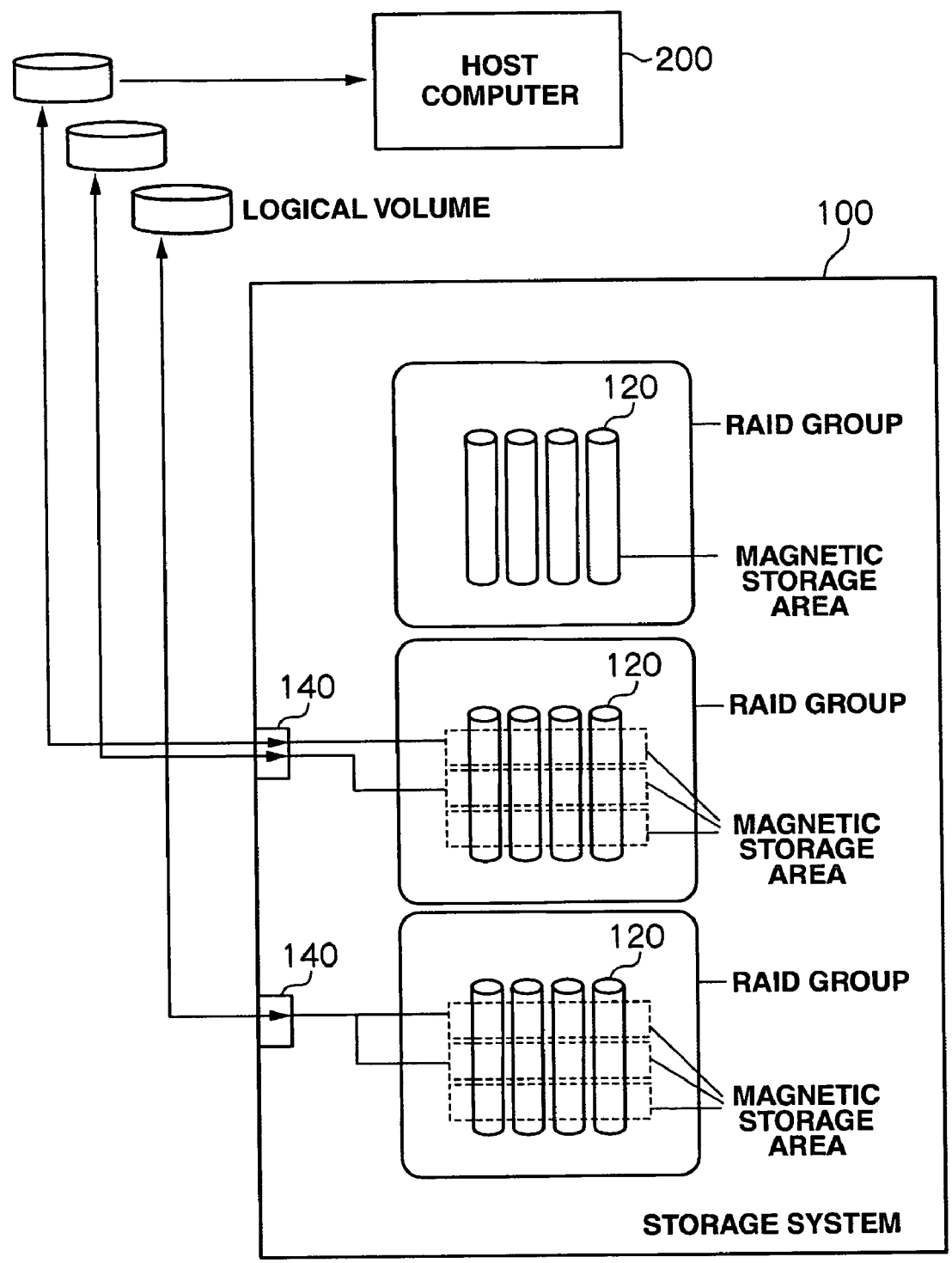
FIG. 3 is a block diagram explaining units for managing storage extents provided by a storage system.

Next, the management unit for the storage extents provided by the storage system 100 is explained with reference to FIG. 3. The magnetic memory apparatuses 120 included in the storage system 100 constitute a plurality of RAID groups. A RAID group is a unit constituting a RAID such as RAID1, RAID5, or RAID6. For example, in the case of RAID5, data to be written in a RAID group is split and recorded in the magnetic memory apparatuses 120 together with parity information. Accordingly, the effect whereby data can be recovered from other magnetic memory apparatuses when one magnetic memory apparatus 120 in the RAID group fails can be obtained.

In the storage extent provided by the RAID group, one or more logical storage extents are defined. A logical storage extent is a unit of a logical area defined over the magnetic memory apparatuses 120 in a RAID group, and is provided with an inherent identification number.

The logical storage extent can be connected externally by making it correspond to the data input/output communication interface 140. This externally accessible logical unit is referred to as a logical volume. A logical volume number is assigned to each correspondence of a data input/output communication interface 140 and a logical storage extent. For the correspondence of the data input/output communication interface 140 and the logical storage extent, a plurality of logical storage extents may be concentrated to form one logical volume.

A logical volume operates within a file system operating on the host computer 200. The operating system or business application operating on the host computer 200 executes data input/output to/from a logical volume.

Figure 4:
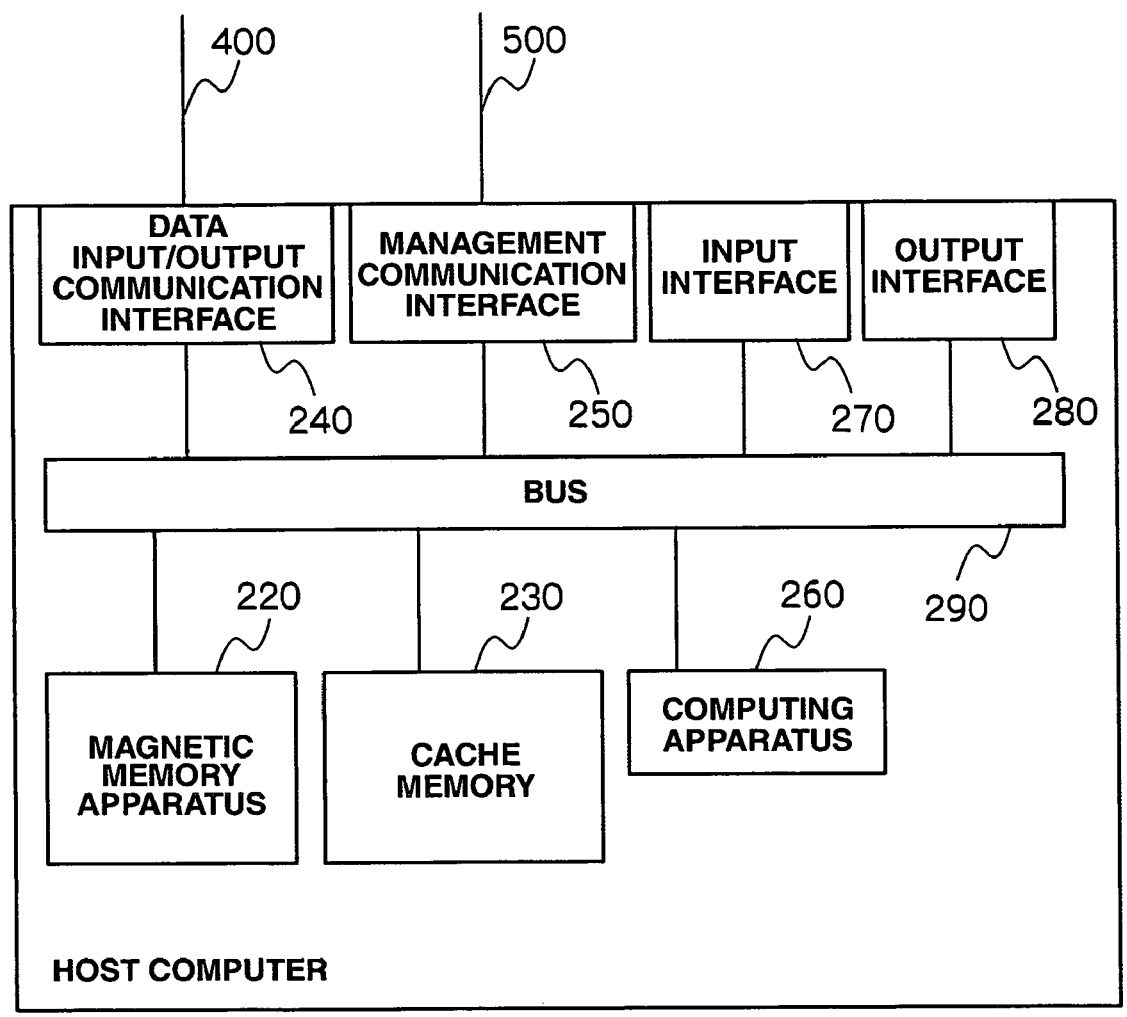
FIG. 4 is a block diagram showing a host computer configuration according to an embodiment of the present invention.

FIG. 4 shows an example configuration for the host computer 200. The host computer 200 has a data input/output communication interface 240 connected to the data network 400 for data input/output, a management communication interface 250 connected to the management network 500 for management information input/output, an input interface 270, such as a keyboard or a mouse, for an operator to input information with, an output interface 280, such as a general-purpose display, for outputting information to the operator, a computing apparatus 260, corresponding to a CPU, for performing various computations, a magnetic memory apparatus 220, and a cache memory 230 generally using a volatile memory, interconnected via a communication bus 290. The data input/output communication interface 240 and the management communication interface 250 may use network input/output devices according to conventional communication techniques such as fiber channel or Ethernet®. In the present invention, the number of data input/output communication interfaces 240, and the number of management communication interfaces 250 is not determined. Furthermore, the management communication interface 250 may not necessarily be an independent one, and the data input/output communication interface 240 can double as the management communication interface 250 and also be used for management.

In other words, the host computer 200 may have the same configuration as those of conventional general-purpose computers (personal computers). The host computer 200 runs an operating system as a general-purpose computer does, and also has application programs, such as database or an accounting program, operate on the operating system. These application programs perform data input/output to/from the logical storage extents provided by the storage system 100, and update data stored in the logical storage extents.

Figure 5:
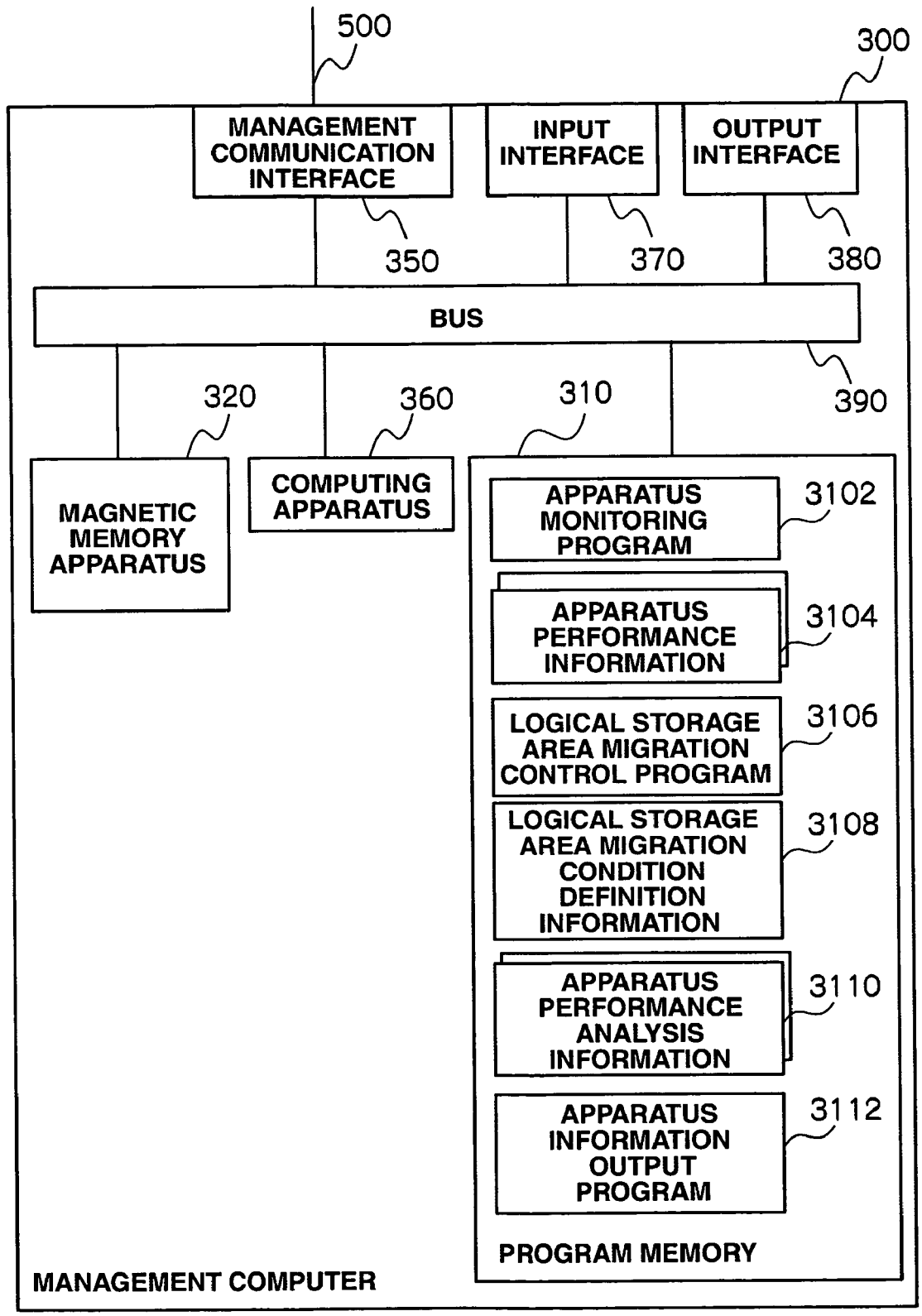
FIG. 5 is a block diagram showing a management computer configuration according to an embodiment of the present invention.

FIG. 5 shows an example configuration for the management computer 300. The management computer 300 has a management communication interface 350 connected to the management network 500 for management information input/output, an input interface 370, such as a keyboard or a mouse, for an operator to input information, an output interface 380, such as a general-purpose display, for outputting information to the operator, a computing apparatus 360, which corresponds to a CPU, for performing various computations, a magnetic memory apparatus 320, and a program memory 310, which is a storage extent for storing programs required for the management computer 300 to operate, interconnected via a communication bus 390.

The program memory 310 is memory space using a magnetic memory apparatus 320 or volatile memory, and is used for the purpose of storing basic programs and information required for the management computer 300 to operate. In the program memory 310, an apparatus monitoring program 3102 for monitoring the operating status of the storage system 100, apparatus performance information 3104, which is operation information obtained by the apparatus monitoring program 3102, a logical storage extent migration control program 3106 for controlling the processing for migrating a logical storage extent from its current magnetic memory apparatus 120 to another magnetic memory apparatus 120, logical storage extent migration condition definition information 3108 defining processing conditions, such as those for a migration target logical storage extent, in the processing for migrating a logical storage extent, apparatus performance analysis information 3110, which is analysis data formed by performing a re-tally of the apparatus performance information 3104 when executing the processing for migrating the logical storage extent, and an apparatus information output program 3112, which functions to process the apparatus performance information 3104 so as to be easily viewable, and outputs the same to a GUI (Graphical Use Interface) for am operator's review are stored.

Furthermore, when the management computer 300 manages a plurality of storage systems 100, the apparatus performance information 3104 and the apparatus performance analysis information 3110 may be retained for each managed storage system 100.

FIG. 6 shows an example configuration for the magnetic memory apparatus configuration information 1102 included in the storage system 100. The RAID group identification information stored in the RAID group identification information column 11021 is information for uniquely identifying the aforementioned RAID group consisting of a plurality of magnetic memory apparatuses 120. RAID group logical storage capacity stored in the RAID group logical storage capacity 11022 is the logical storage capacity of the RAID group identified by the RAID group identification information. The RAID level stored in the RAID level column 11023 indicates the RAID level and configuration content of the RAID group. The magnetic memory apparatus identification information stored in the magnetic memory apparatus identification information column 11024 is information for uniquely identifying the magnetic memory apparatuses 120 constituting the RAID group. The magnetic memory apparatus physical storage capacity stored in the magnetic memory apparatus physical storage capacity column 11025 is the physical capacity of the magnetic memory apparatuses 120 identified by the magnetic memory apparatus identification information. The magnetic memory apparatus power specification stored in the magnetic memory apparatus power specification column 11026 is the power consumption specification for each magnetic memory apparatus 120 identified by the magnetic memory apparatus identification information.

The more specific content of the magnetic memory apparatus configuration information 1102 shown in FIG. 6 is described below. A RAID group "RG#0 " is a RAID group consisting of four magnetic memory apparatuses, each having a physical storage capacity of "300 [GB]," and the total physical capacity amounts to 1200 (300×4) [GB]. Meanwhile, since the RAID level of that RAID group is defined as "RAID5 3D+1P," one-fourth of the physical storage capacity is used as a region for storing parity information. Thus, the storage extent capacity that can substantively store data, i.e., the logical storage extent capacity is 900 (1200×¾) [GB]. The respective power specification values of the magnetic memory apparatuses 120 from "hd#0" to "hd#3" are all 0.6 [KW/h]. Thus, a one-hour operation of the RAID group "RG#0" consumes power of 2.40 (0.6×4) [KW].

FIG. 7 shows an example configuration for the logical storage extent configuration information 1104 contained in the storage system 100. The RAID group identification information stored in the RAID group identification information column 11041 is information for uniquely identifying a RAID group consisting of a plurality of magnetic memory apparatuses 120. The logical storage extent identification information stored in the logical storage extent identification information column 11042 is information for uniquely identifying a logical storage extent defined in the RAID group identified by the RAID group identification information. The logical storage extent logical storage capacity stored in the logical storage extent logical storage capacity column 11043 is the logical storage capacity of the logical storage extent identified by the logical storage extent identification information.

The more specific content of the logical storage extent configuration information 1104 shown in FIG. 7 is explained below. In the RAID group "RG#0," three logical storage extents "LDEV#0," "LDEV#1," and "LDEV#2" are defined, and their respective logical storage capacities are "400 [GB]," "250 [GB]," and "250 [GB]."

FIG. 8 shows an example configuration for the logical storage extent map information 1106 included in the storage system 100. The logical storage extent map information 1106 defines the relationship between a logical storage extent and the host computer 200.

The data input/output communication interface information stored in the data input/output communication interface column 11061 is information for uniquely identifying a data input/output communication interface 140 included in the storage system 100. The logical volume number stored in the logical volume number column 11062 corresponds to a logical unit of a storage extent provided by the host computer 200 via the communication interface 140 specified in the data input/output communication interface column 11061. The logical storage extent identification information stored in the logical storage extent identification information column 11063 indicates a logical storage extent assigned to the logical volume identified by the logical volume number. The connectable computer apparatus identification information stored in the connectable computer apparatus identification information column 11064 is information for uniquely identifying a host computer 200 permitting connection to the logical volume identified by the logical volume number. In order to uniquely identify the connection destination host computer 200, a fiber channel WWN (World Wide Name), or an IP network MAC (Media Access Control) address, for example, may be used.

The logical storage extent map information 1106 shown in FIG. 8 is more specifically explained below. In a provided logical volume "LUN#10" accessible from the outside of the storage system 100 via a data input/output communication interface 140 called "NIF#0" that is specified by the data input/output communication interface information, a logical storage extent called "LDEV#0" is registered. The connection to the logical volume "LUN#10" is permitted by the host computer 200 identified by "50:00:01:A3:9E:03:00:00," and that logical volume enters into a state in which it accepts input/output. The logical storage extent "LDEV#0" also corresponds to a logical volume "LUN#20" connected to a data input/output communication interface 140 referred to as "NIF#1." In other words, the logical storage extent "LDEV#0" is assigned to two logical volumes, allowing access from the two data input/output communication interfaces 140.

FIG. 9 is an example configuration for the logical storage extent performance information 1108 included in the storage system 100. The measurement start time stored in the measurement start time column 11081 and the measurement end time stored in the measurement end time column 11082 indicate the time the operating status of the logical storage extent is monitored. The logical storage extent identification information stored in the logical storage extent identification information column 11083 is information for uniquely identifying the monitored logical storage extent. The number of input/output requests stored in the input/output request count column 11084 is the number of input/output requests (I/O requests) made within the measured time to the logical storage extent identified by the logical storage extent identification information. Here, an input/output request may be an SCSI (Small Computer System Interface) protocol I/O request command sent from a host computer 200. The data transfer amount stored in the data transfer amount column 11085 represents the average per second data amount [MB] sent/received to/from the logical storage extent identified by the logical storage extent identification information. The number of input/output requests and the data transfer amount can be a yardstick for evaluating the performance of the logical storage extent.

FIG. 10 shows an example configuration for the magnetic memory apparatus performance information 1112 included in the storage system 100. The measurement start time stored in the measurement start time column 11121 and the measurement end time stored in the measurement end time column 11122 indicate the time the magnetic memory apparatus operation monitoring program 1110 monitors the operating status of the magnetic memory apparatus 120. The magnetic memory apparatus identification information stored in the magnetic memory apparatus identification information column 11123 is information for uniquely identifying a monitored magnetic memory apparatus 120. The magnetic memory apparatus operation rate stored in the magnetic memory apparatus operation rate column 11124 indicates as a percentage the operating time of the magnetic memory apparatus 120 identified by the magnetic memory apparatus identification information within the measured time.

The magnetic memory apparatus performance information 1112 shown in FIG. 10 is more specifically explained below. According to the example shown in FIG. 10, the magnetic memory apparatus "hd#0" operated at an operation rate of "41.67[%]" during the measured time from "2005/06/01 0:00" to "2005/06/01 5:59." In other words, the magnetic memory apparatus "hd#0" operated only for 2.5 (=6×0.4167) [hours] within the measured time of six hours.

FIG. 11 shows an example configuration for the apparatus operation performance information 3104 included in the management computer 300. The measurement start time stored in the measurement start time column 31041 and the measurement end time stored in the measurement end time column 31042 indicate measured time. The RAID group operation information stored in the RAID group information column 31043 is RAID group operation information within the measured time. The identification information stored in the identification information column 31044 is information for uniquely identifying the monitored group. The power specification value stored in the power specification column 31045 is the power consumption specification value for the RAID group to operate. The power consumption value stored in the power consumption column 31046 is the actual value of power consumption within the measured time.

Logical storage extent operation information 31047 shows the performance of a logical storage extent registered in the RAID group. The identification information stored in the identification information column 31048 is information for uniquely identifying a logical storage extent defined in the RAID group. The number of input/output requests stored in the input/output request count column 31049 is the number of input/output requests made to the logical storage extent identified by the logical storage extent identification information within the measured time. The data transfer amount stored in the data transfer amount column 310410 indicates the average per second data amount [MB/sec] sent/received to/from the logical storage extent within the measured time.

The apparatus performance information 3104 shown in FIG. 11 is more specifically explained below. FIG. 11 indicates that the RAID group "RG#0" consumed power of "1.00 [KW/h]" within the measured time from "2005/06/01 0:00" to "2005/06/01 5:59." It indicates that 700 input/output requests to the logical storage extent "LDEV#0"were processed within the measured time, and that the average per second data amount sent/received to/from the logical storage extent "LDEV#0" was "20 [MB/sec]."

FIGS. 12 to 15 show the flow of processing for the computing apparatus 360 (FIG. 5) of the management computer 300 to prepare (update) the apparatus performance information 3104 (FIG. 11).

Figure 12:
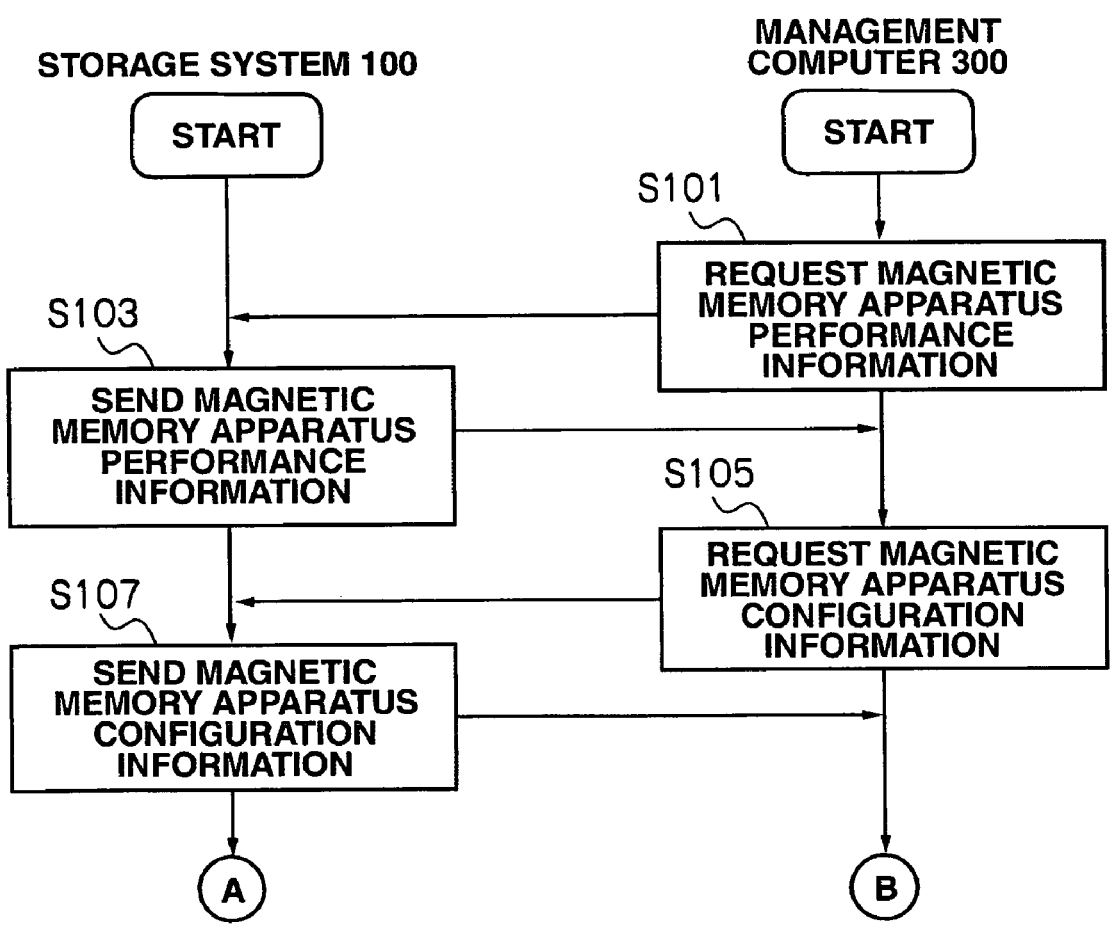
FIG. 12 is a flowchart indicating the procedure for update processing for apparatus performance information.

At step S101 in FIG. 12, the computing apparatus 360, following the apparatus monitoring program 3102 (FIG. 5), requests sending of the magnetic memory apparatus performance information 1112 (FIG. 10) retained in the storage system 100. The storage controller 190 of the storage system 100, upon receiving the request, sends the magnetic memory apparatus performance information 1112 to the management computer 300 (S103).

The computing apparatus 360 of the management computer 300, upon receiving the magnetic memory apparatus performance information 1112, temporarily stores that information in a storage extent. Furthermore, the computing apparatus 360, following the apparatus monitoring program 3102, requests sending of the magnetic memory apparatus configuration information 1102 (FIG. 6) (S105). The storage controller 190 of the storage system 100, upon receiving the request, sends the magnetic memory apparatus configuration information 1102 to the management computer 300 (S107). The computing apparatus 360 of the management computer 300, upon receiving the magnetic memory apparatus configuration information 1102, temporarily stores that information in a storage extent.

Figure 13:
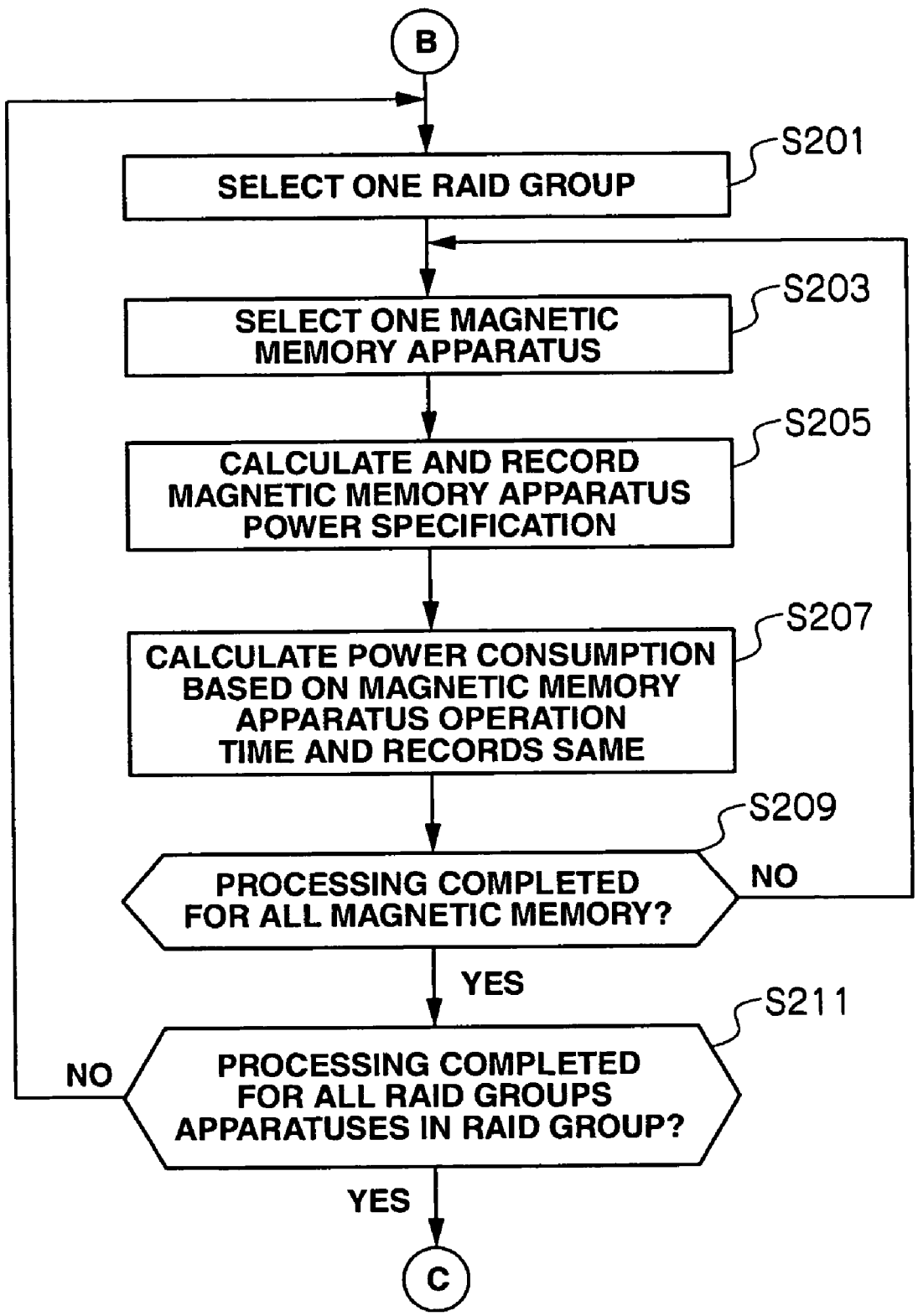
FIG. 13 is a flowchart indicating the procedure for update processing for apparatus performance information.

In FIG. 13, the computing apparatus 360 first selects one of the RAID groups registered in the magnetic memory apparatus configuration information 1102 (S201), and then selects one of the magnetic memory apparatuses in that RAID group (S203). Subsequently, the computing apparatus 360 adds the magnetic memory apparatus power specification values (stored in the magnetic apparatus power specification column 11026) for the magnetic memory apparatuses 120 identified by the magnetic memory apparatus identification information stored in the magnetic memory apparatus information column 11024 for each RAID group, and records the addition results in the apparatus performance information 3104 (FIG. 11) (S205). Furthermore, the computing apparatus 360 calculates the power consumption for each magnetic memory apparatus 120 registered in the magnetic memory apparatus operation rate column 11124 of the magnetic memory apparatus performance information 1112 (FIG. 10), and stores the calculation results in the power consumption column 31046 (S207).

Subsequently, the computing apparatus 360 judges whether or not processing has been completed for all the magnetic memory apparatuses in the RAID group selected at step S201 (S209), and if the processing has not been completed (S209: NO), the same processing is repeated for all those magnetic memory apparatuses 120. When processing has been completed for all the magnetic memory apparatuses 120 in the RAID group selected at step S201 (S209: YES), the computing apparatus 360 judges whether or not the processing has been completed for all RAID groups (S211). If the processing has not been completed (S211: NO), the same processing is repeated for all RAID groups. When the processing has been completed for all RAID group (S211: YES), the computing apparatus 360 ends the above series of processing.

The processing indicated in FIG. 13 is more specifically explained below using the examples shown in FIGS. 6 and 10. The computing apparatus 360 of the management computer 300 selects one RAID group from the RAID groups ("RG#0," "RG#1," "RG#2" . . . ) registered in the magnetic memory apparatus configuration information 1102 (FIG. 6), at step S201, and at the subsequent step S203, it selects one magnetic memory apparatus from the magnetic memory apparatuses ("hd#0" to "hd#3," "hd#4" to "hd#7," "hd#8" to "hd#11" . . . ) belonging to the RAID group selected at step S201.

Then, at step S205, the computing apparatus 360 performs processing for adding the magnetic memory apparatus power specification values stored in the corresponding magnetic memory apparatus power specification column 11026 (FIG. 6) in the magnetic memory apparatus configuration information 1102. With regard to the RAID group "RG#0," for example, as the magnetic memory apparatus power specification values for the magnetic memory apparatuses 120 are all "0.6 [KW/h]," the addition result will be 2.40 (0.6+0.6+0.6+0.6) [KW/h]. The computing apparatus 360 stores this addition result in the corresponding power specification column 31045 in the apparatus performance information 3104 (FIG. 11).

Furthermore, the computing apparatus 360 calculates the power consumption for the entire RAID group at the next step S207. Here, the computing apparatus 360 refers to the magnetic memory apparatus operation rate stored in the corresponding magnetic memory apparatus operation rate column 11124 in the magnetic memory apparatus performance information 1112 (FIG. 10). For example, in the example shown in FIG. 10, as the respective operation rates of the magnetic memory apparatuses "hd#0," "hd#1," "hd#2," "hd#3" constituting the above RAID group "RG#0" were measured at all "41.67 [%]," the total power consumption within the measured time will be calculated as 1.00 [KW/h] (2.40×0.4167). The computing apparatus 360 stores this "1.00 [KW/h]" in the corresponding power consumption column 31046 in the apparatus performance information 3104 (FIG. 11).

Figure 14:
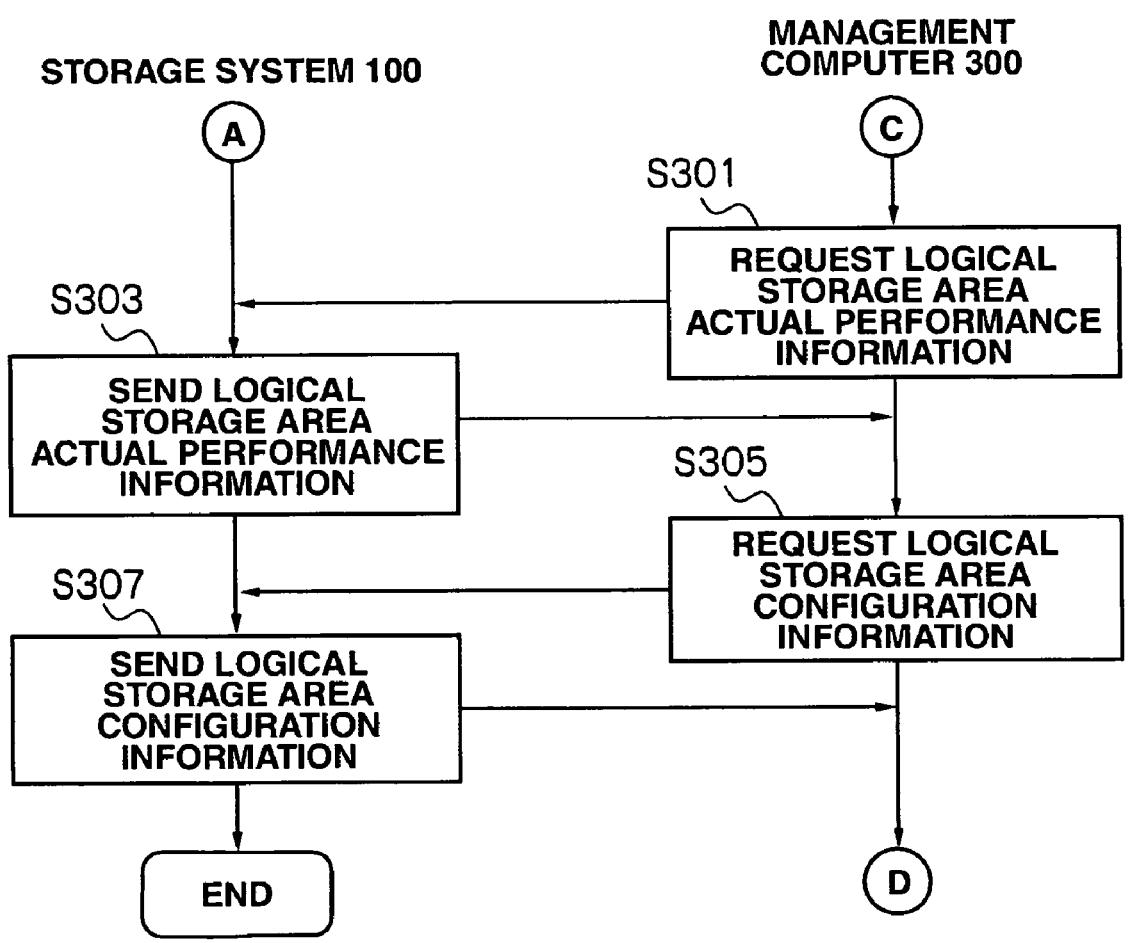
FIG. 14 is a flowchart indicating the procedure for update processing for apparatus performance information.

Next, in FIG. 14, as in FIG. 12, the computing apparatus 360 of the management computer 300 obtains the logical storage extent performance information 1108 (FIG. 9) and the logical storage extent configuration information 1104 (FIG. 7) from the storage system 100, and temporarily stores them in a storage extent.

Specifically, at step S301 shown in FIG. 14, the computing apparatus 360 of the management computer 300, following the apparatus monitoring program 3102 (FIG. 5), requests sending of the logical storage extent performance information 1108 (FIG. 9) retained by the storage system 100. The storage controller 190 of the storage system 100, upon receiving the request, sends the logical storage extent performance information 1108 to the management computer 300 (S303).

The computing apparatus 360 of the management computer 300, upon receipt of the logical storage extent perfor-
mance information 1108, temporarily stores the information in a storage extent. Furthermore, the computing apparatus 360, following the apparatus monitoring program 3102 (S305), requests sending of the logical storage extent configuration information 1104 (FIG. 7). The storage controller 190 of the storage system 100, upon receiving the request, sends the logical storage extent configuration information 1104 to the management computer 300 (S107). The computing apparatus 360 of the computer 300, upon receipt of the logical storage extent configuration information 1104, temporarily stores the information in a storage extent.

Figure 15:
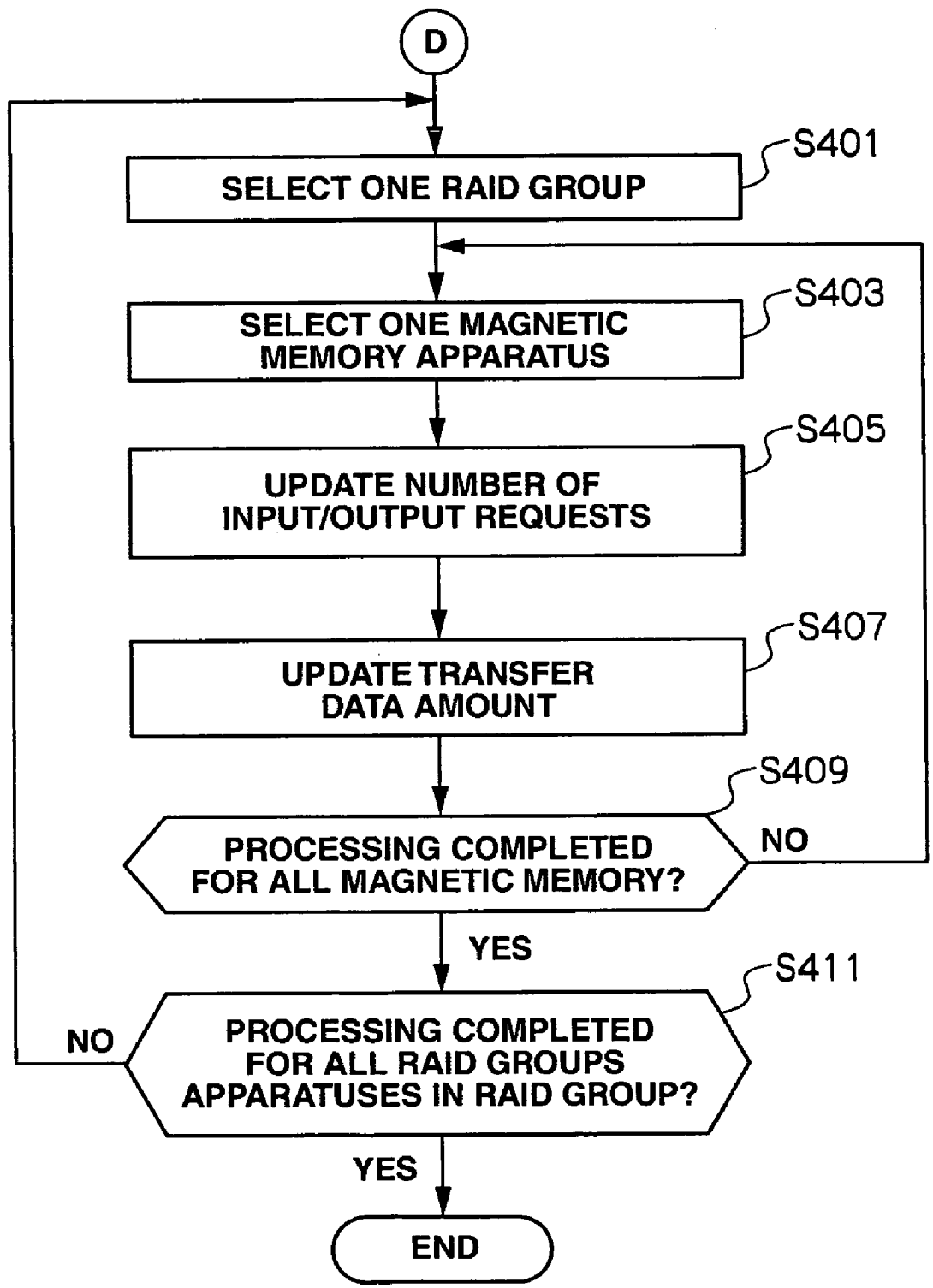
FIG. 15 is a flowchart indicating the procedure for update processing for apparatus performance information.

In FIG. 15, the computing apparatus 360 first selects one of the RAID groups registered in the logical storage extent configuration information 1104 (S401), and then selects one of the magnetic memory apparatuses in that RAID group (S403). Subsequently, the computing apparatus 360 updates the number of input/output requests stored in the corresponding input/output request count column 31049 in the logical storage extent operation information 31047 of the apparatus performance information 3104 (FIG. 11) with reference to the value stored in the corresponding input/output request count column 11084 of the logical storage extent performance information 1108 (FIG. 9) for each RAID group (S405). In the same way, it updates the corresponding data transfer amount stored in the logical storage extent performance information column 31047 of the apparatus performance information 3104 (FIG. 11) with reference to the value stored in the corresponding data transfer amount column 11085 of the logical storage extent performance information 1108 (FIG. 9) (S407).

Subsequently, the computing apparatus 360 judges whether or not the processing has been completed for all the magnetic memory apparatuses 120 in the RAID group selected at step S401 (S409), and if the processing has not been completed (S409: NO), the same processing is repeated for all those magnetic memory apparatuses 120. When the processing has been completed for all the magnetic memory apparatuses in the RAID group selected at S401 (S409: YES), the computing apparatus 360 judges whether or not the processing has been completed for all of the RAID groups (S411), and if the processing has not been completed (S411: NO), the same processing is repeated for all of the RAID groups. When the processing has been completed for all of the RAID groups (S411: YES), the computing apparatus 360 ends this series of processing.

FIG. 16 shows an example configuration for the logical storage extent migration condition definition information 3108 included in the management computer 300. The migration target logical storage extent condition(s) stored in the migration target logical storage extent condition column 31081 defines conditions for judging a logical storage extent as a migration target logical storage extent. Of the input/output request conditions, the input/output concentration rate stored in the input/output concentration rate column 31082 indicates the percentage of the number of input/output requests to the judged logical storage extent out of the total number of input/output requests to that RAID group. In other words, a high input/output concentration rate means that the percentage of the inputs/outputs for that logical storage extent out of the inputs/outputs for the RAID group is high. Of the input/output request conditions, the conditional expression stored in the conditional expression column 31083 indicates a judgment criterion based on the input/output concentration rate. The example shown in FIG. 16 indicates that the input/output concentration rate for the judged logical storage extent conforms to the judgment criterion when it is smaller than ("<") "15 [%]."

Of the data transfer amount conditions, the data transfer amount stored in the data transfer amount column 31084 indicates an average per second data transfer amount relating to the judged logical storage extent. The conditional expression stored in the conditional expression column 31085 indicates a judgment criterion based on the data transfer amount. The example shown in FIG. 16 indicates that the data transfer amount measurement value for the judged logical storage extent conforms to the judgment criterion when it is smaller than ("<") "10 [MB/sec]."

Of the power consumption conditions, the power consumption rate stored in the power consumption rate column 31086 indicates the percentage of the power consumption for the judged logical storage extent or the RAID group including the logical storage extent, out of the maximum power consumption during continuous operation, and the conditional expression stored in the conditional expression column 31087 indicates a judgment criterion based on the power consumption rate. Here, for example, when a power consumption rate is calculated based on the performance shown in FIG. 11, as the RAID group "RG#3" exhibits the maximum power consumption amount during continuous operation of "2.4 [KW/h]" while the actual power consumption measurement value was "0.48 [KW/h]," the power consumption rate will be 20 (0.48/2.4×100) [%]. The example shown in FIG. 16 indicates that a power consumption rate of greater than (">") "55%" conforms to the judgment criterion.

The conditions stored in the migration destination logical storage extent condition column 31088 are conditions for judging a logical storage extent as a migration destination. In this embodiment, only power consumption is indicated as a condition. The power consumption rate stored in the power consumption rate column 31089 indicates the percentage of the power consumption for the judged logical storage extent or the RAID group including the logical storage extent, out of the maximum power consumption during continuous operation, and the conditional expression stored in the conditional expression column 31010 indicates a judgment criterion based on the power consumption rate.

The migration target logical storage extent condition may be comprised of any one of: the number of input/output requests, the data transfer amount, and the power consumption. In other words, as in the example shown in FIG. 16, when the data transfer amount condition is not defined (expressed by n/a), it is not necessary to use it for judgment processing. Moreover, there may be a plurality of conditional expressions. FIG. 16 shows a combined judgment condition definition, such as input/output requests condition "larger than (>)" "5 [%]" and "smaller than (<)" "30 [%]."

FIG. 17 shows an example configuration for the apparatus performance analysis information 3110 included in the management computer 300. The analysis start time stored in the analysis start time column 31101 and the analysis end time stored in the analysis end time column 31102 indicate the analysis time period. The RAID group operation time information stored in the RAID group operation information column 31103 is the operation rate of the analyzed RAID group. The identification information stored in the identification information column 31104 is information for uniquely identifying the analyzed RAID group. The power consumption rate stored in the power consumption rate column 31105 indicates, as does the power consumption rate stored in the power consumption rate column 31086 of the logical storage extent migration condition definition information 3108 mentioned above in relation to FIG. 16, the power consumption rate calculation results of the RAID group identified by the identification information stored in the identification information column 31104.

The logical storage extent operation information stored in a logical storage extent operation information column 31106 indicates the performance of the analyzed logical storage extent defined in the RAID group. The identification information stored in the identification information column 31107 is information for uniquely identifying the analyzed logical storage extent period. The number of input/output requests stored in the input/output request count column 31108 is the number of input/output requests for the analyzed logical storage extent during the analysis time. The input/output concentration rate stored in the input/output concentration rate column 31109 indicates, as does the input/output concentration rate stored in the input/output concentration rate column 31082 of the logical storage extent migration condition definition information 3108 mentioned in relation to FIG. 16, out of the total number of the input/output requests received by the RAID group, the percentage of the input/output requests to the analyzed logical storage extent. The data transfer amount stored in the data transfer amount column 311010 indicates the average per second value of the data amount sent/received by the analyzed logical storage extent.

The RAID group "RG#2" shown in FIG. 17 does not define a logical storage extent and the operation rate of the RAID group is "0 [%]," which indicates that the magnetic memory apparatuses 120 constituting the RAID group "RG#2" did not operate during the analysis time period from "2005/06/01 0:00" to "2005/06/01 23:59."

Figure 18:
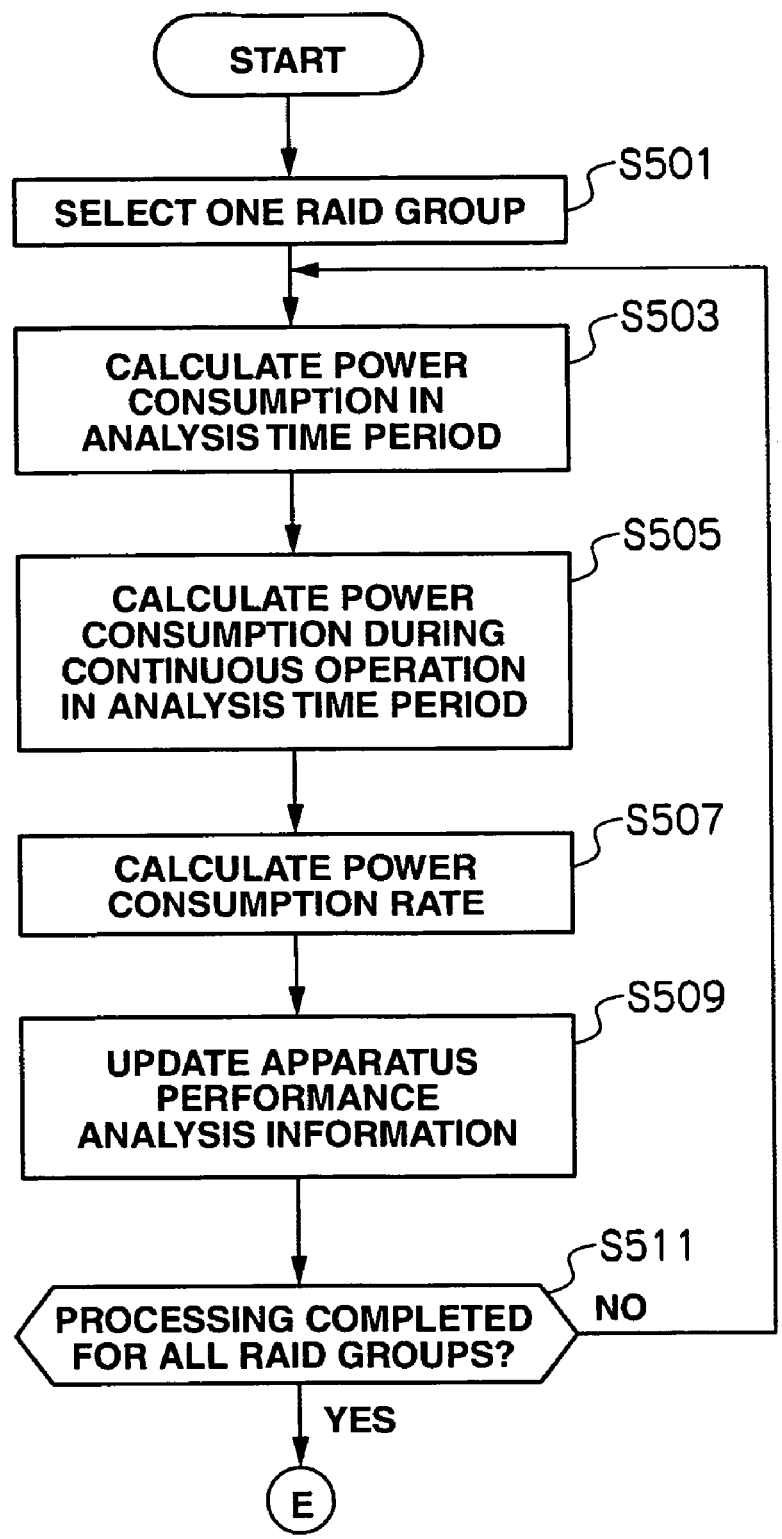
FIG. 18 is a flowchart indicating the procedure for update processing for apparatus performance analysis information.
Figure 19:
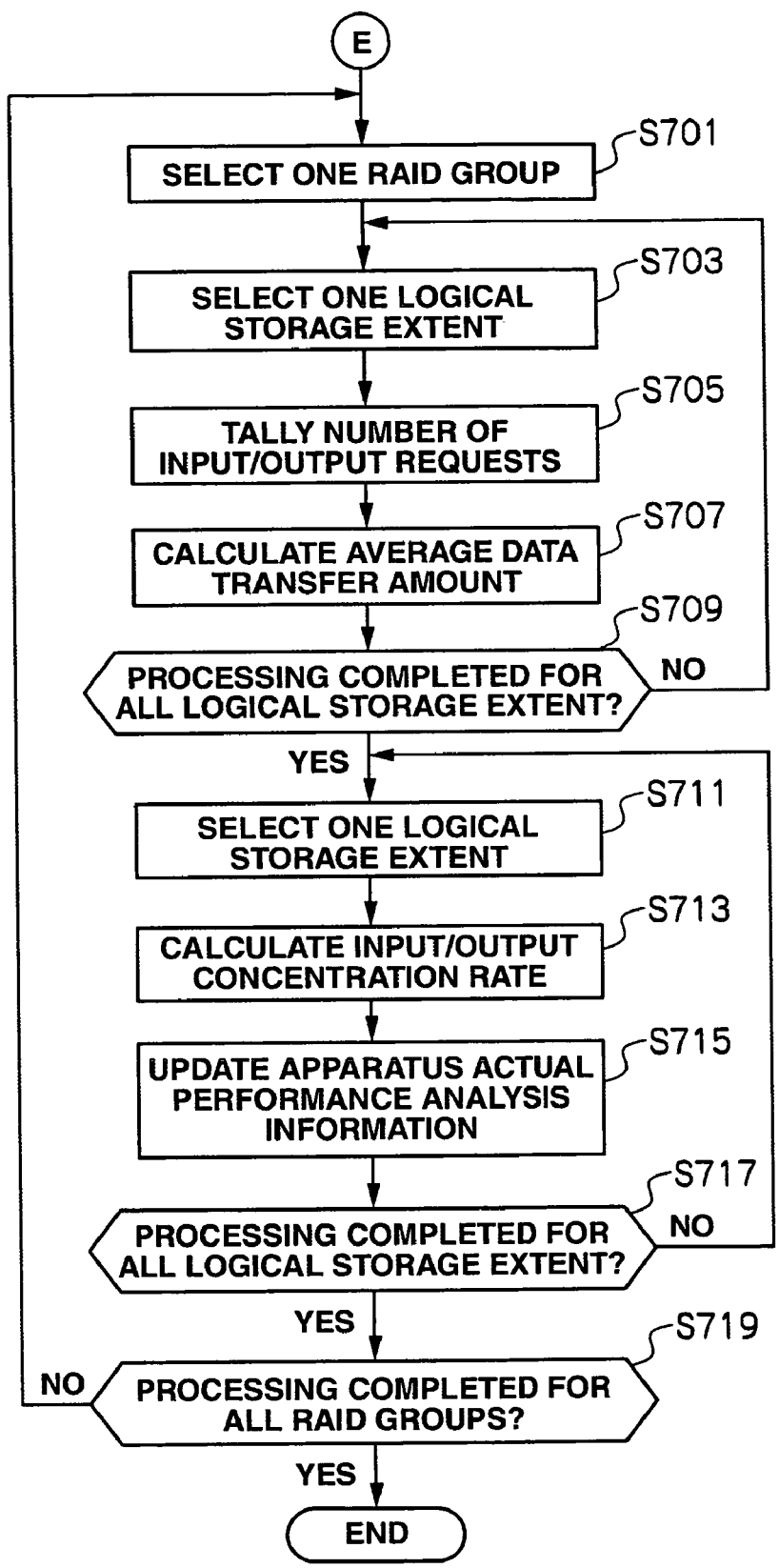
FIG. 19 a flowchart indicating the procedure for update processing for apparatus performance analysis information.

FIGS. 18 and 19 indicate the flow of processing for preparing (updating) the logical storage extent operation analysis information 3110 shown in FIG. 17. The computing apparatus 360 of the management computer 300 prepares the logical storage extent operation analysis information 3110 with reference to the apparatus performance information 3104 (FIG. 11).

First, the computing apparatus 360 selects one RAID group from the RAID groups registered in the RAID group operation information 31043 of the apparatus performance information 3104 (S501), and then calculates the power consumed by the RAID group during a certain analysis time period (S503). The power consumption values for the RAID group, which are recorded in the corresponding power consumption column 31046 of the apparatus performance information 3140 (FIG. 11), may be added for a specified analysis time period. In the same way, the computing apparatus 360 calculates the power consumption for the scenario where the RAID group continuously operates during the analysis time period, with reference to the value in the corresponding power specification column 31045 of the apparatus performance information 3104, as power consumption during continuous operation for the analysis time period (S505). Then the computing apparatus 360 calculates the power consumption rate for the entire RAID group based on the above data (S507), and updates the value in the corresponding power consumption rate column 31105 of the apparatus performance analysis information 3110 (S509).

The processing shown in FIG. 18 is more specifically explained below using the example shown in FIG. 11. The management computer 300 adds the values in the apparatus performance information 3104 for the analysis time period from "2005/06/01 0:00" to "2005/06/01 23:59."

(1) From "2005/06/01 0:00" to "2005/06/01 5:59" (first row)

(2) From "2005/06/01 6:00" to "2005/06/01 11:59" (second row)

(3) From "2005/06/01 12:00" to "2005/06/01 17:59" (third row)

(4) From "2005/06/01 18:00" to "2005/06/01 23:59" (fourth row)

The observed data values for the RAID group "RG#0" recorded in (1) to (4) respectively are added, making it possible to calculate the performance during the above analysis time period.

The total of the power consumption values stored in the power consumption column 31046 for the RAID group "RG#0" with regard to all the time during the analysis time period at step S503 can be obtained as follows:

$$1.00\times6+1.88\times6+1.88\times6+1.00\times6=34.56 \text{ [KW]} \quad (1)$$

The power consumption during continuous operation of the RAID group "RG#0" at step S505 can be calculated as follows:

$$2.40\times6+2.40\times6+2.40\times6+2.46\times6=57.6 \text{ [KW]} \quad (2)$$

At step S507, based on the above results, the power consumption rate can be calculated as follows:

$$34.56/57.6\times100=60 \text{ [\%]} \quad (3)$$

At step S509, the calculation result is recorded in the corresponding power consumption rate column 31105 in the apparatus performance analysis information 3110.

FIG. 19 shows the flow of processing for calculating performance information for a logical storage extent. The computing apparatus 360 of the management computer 360 first selects one of the RAID groups registered in the magnetic memory apparatus configuration information 1102 (S701), and then selects one of the logical storage extents in the RAID group (S703).

Subsequently, the computing apparatus 360 adds all corresponding values in the input/output request count column 31049 during the analysis time period in the apparatus performance information 3104 with regard to a RAID group, thereby obtaining the total number of input/output requests to its logical storage extents during the analysis time period (S705), and also obtaining an average of the values in the data transfer amount column 310410 during the analysis time period (S707). Also, the computing apparatus 360, in the same way as above, obtains the total of the values in the input/output request count column 31049 during the analysis time period, and the average of the values in the data transfer amount column 31049 during the analysis time period, for all of the respective storage extents (S703 to S709).

The computing apparatus 360 then selects one logical storage extent in the same RAID group (S711), and calculates the percentage of input/output requests to that logical storage extent out of the total number of input/output requests to that RAID group (input/output concentration rate) (S713). The management apparatus 360 then records the above results respectively in the input/output request count column 31108, the input/output concentration rate column 33109, and the data transfer amount rate 311010 of the apparatus performance analysis information 3110 (FIG. 17) (S715).

The processing shown in FIG. 19 is more specifically explained below using the example shown in FIG. 11. The computing apparatus 360 adds the measured values for the analysis period of time from "2005/06/01 0:00" to "2005/06/01 23:59" (first, second, third and fourth rows in FIG. 11). In the example shown in FIG. 11, the input/output request number 31049 during the analysis time period for the logical storage extent "LDEV#0" can be calculated as follows:

$$700+1000+2400+700=4800 \quad (4)$$

In the same way, the number of input/output requests for the logical storage extents "LDEV#1" and "LDVE#2" will be 6000 and 1200, respectively.

Moreover, the data transfer amount 310410 can be calculated as follows (S707):

$$(20+58+28+5)/4=27.75 \text{ [MB/sec]} \quad (5)$$

The input/output concentration rate during the analysis time period can be obtained as follows (S713):

$$4800/(4800+6000+1200)\times100=40 \text{ [\%]} \quad (6)$$

The computing apparatus 360 records the above results respectively in the input/output request count column 31108, the input/output concentration rate column 31109, and the data transfer amount column 311010 of the apparatus performance analysis information 3110.

Figure 20:
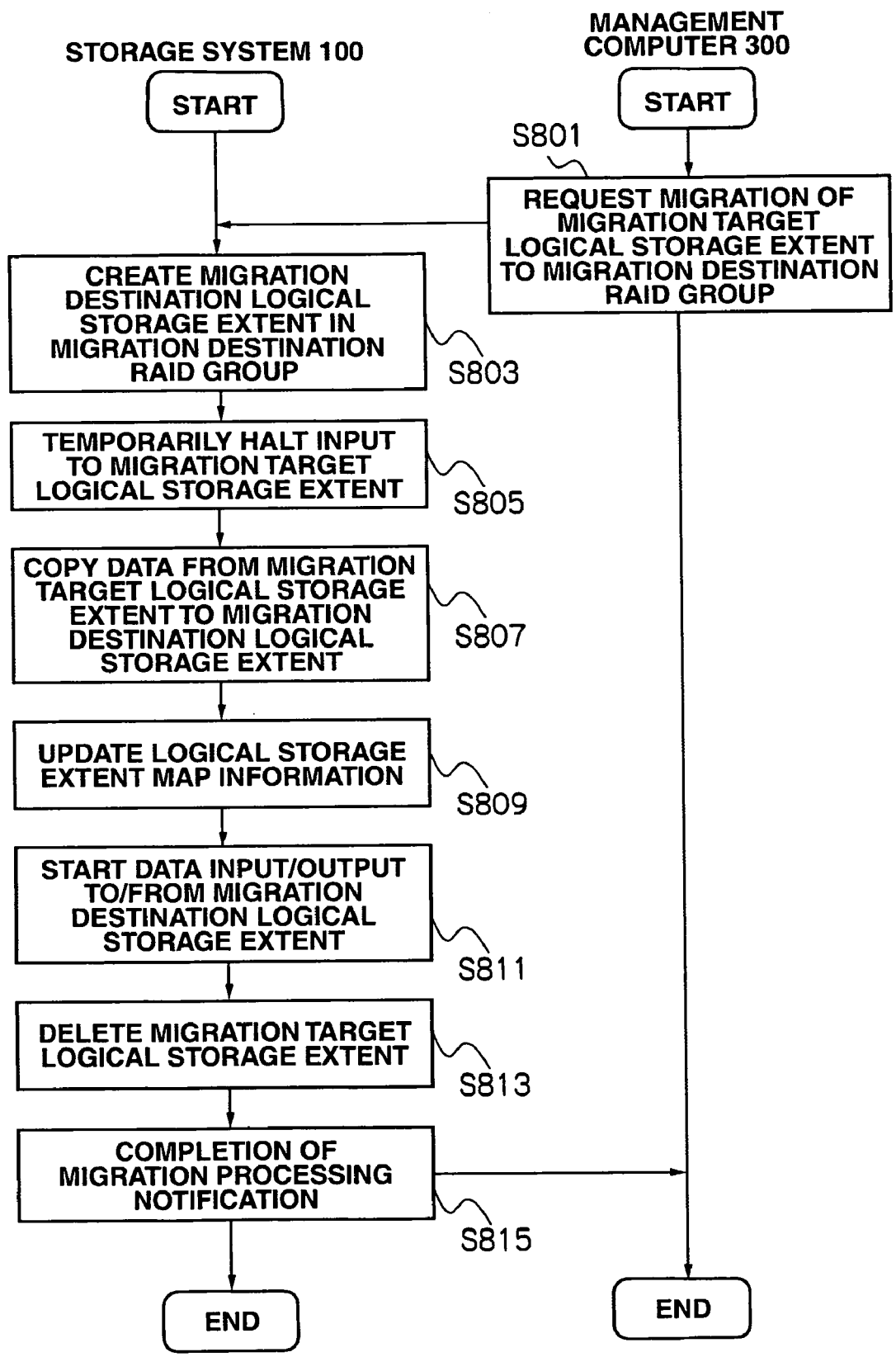
FIG. 20 is a flowchart indicating the procedure for migration processing for a logical storage extent.

FIG. 20 shows the flow of processing for migrating a logical storage extent from its current RAID group to another RAID group by a function of the storage system 100. The logical storage extent (source logical storage extent) judged to be a migration target logical storage extent as a result of the logical storage extent migration judgment described later is processed by the procedure shown in FIG. 20.

First, the computing apparatus 360 of the management computer 300, based on the logical storage extent migration control program 3106, sends a migration request message command containing identification information concerning the migration target logical storage extent, and identification information concerning a migration destination RAID group to the storage system 100 (S801).

The storage controller 190 of the storage system 100, upon receiving the above command, activates the logical storage extent migration program 1114 to start logical storage extent migration processing. In other words, the storage controller 190 creates a migration destination logical storage extent in a RAID group designated as the migration destination, in accordance with the logical storage extent migration program 1114 (S803). This migration destination logical storage extent must have a capacity larger than the data amount stored in the migration target logical storage extent.

Furthermore, if the migration target logical storage extent is connected to a host computer 200 and is in a state allowing input, the storage controller 190 temporarily halts input to that logical storage extent (S805). Halting output is not necessarily required.

Next, the storage controller 190 copies the data stored in the migration target logical storage extent to the migration destination logical storage extent (S807).

Next, the storage controller 190 updates the mapping information in the logical storage extent map information 1106 (S809). Here, the logical storage extent identification information stored in the logical storage extent identification information column 11063 in the logical storage extent map information 1106 for the migration target logical storage extent (FIG. 8) may be written in the logical storage extent identification information column 11063 in the logical storage extent map information 1106 for the migration destination logical storage extent.

By the above processing, input/output data from the host computer 200 to the migration target logical storage extent is directed to the migration destination logical storage extent (S811). Finally, the storage controller 190 deletes (releases) the migration target logical storage extent from the RAID group (S813), and notifies the management computer 300 of the completion of the migration processing (S815).

FIGS. 21 to 26 each show an example configuration for a management screen (GUI) V101 provided by the computing apparatus 360 of the management computer 300 to an operator via the output interface 380, based on the apparatus information output program 3112.

Figure 21:
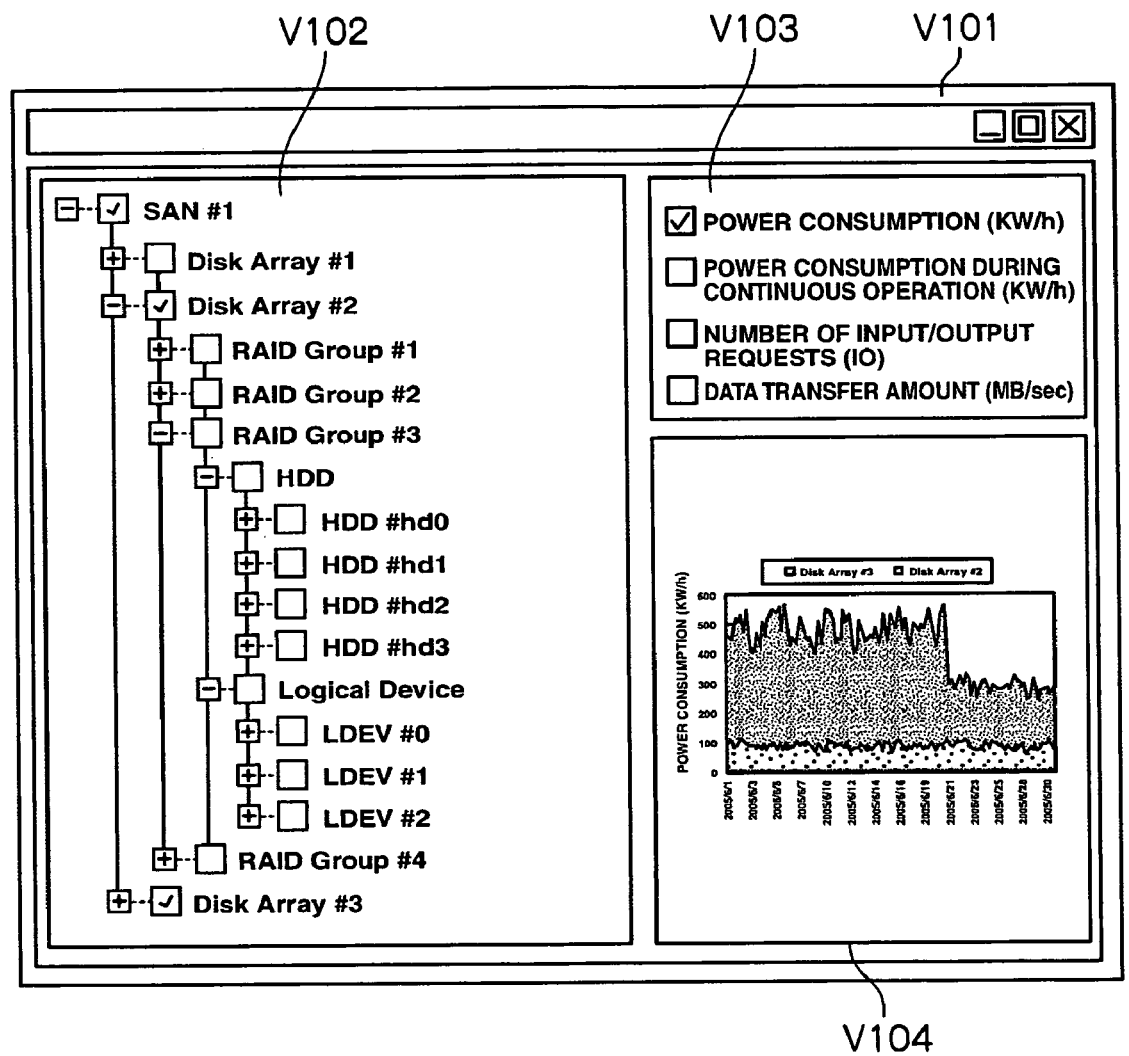
FIG. 21 is a schematic diagram indicating an example configuration for a management screen provided by a management computer.

FIG. 21 shows an example of the management screen V101 provided by the apparatus information output program 3112. The management screen V101 is divided into three main panes (windows) V102 to V104. The left pane V102, in tree layout, enables selecting a storage system 100 to be managed, and a RAID group, a magnetic memory apparatus (HDD), and a logical storage extent (Logical Device), which are constituent units of that storage system 100. For example, it makes it possible to display data for only the objects (constituent units) for which the boxes in the Figure are checked.

The upper right pane V103 corresponds to an input screen for controlling the content of data to be output. For example, it is used to control the content of data displayed in the lower right pane V104, such as a power consumption value, a power consumption value during continuous operation, the number of input/output requests, or the data transfer amount. When a plurality of boxes is checked, the data for these checked objects is output to a single screen. The kinds of data designated by the upper right pane V103 for the target objects selected by the left pane V102 is output to the lower right pane V104.

The subsequent FIGS. 22 to 26 continue the explanation using an example management screen with the left pane V102 omitted.

Figure 22:
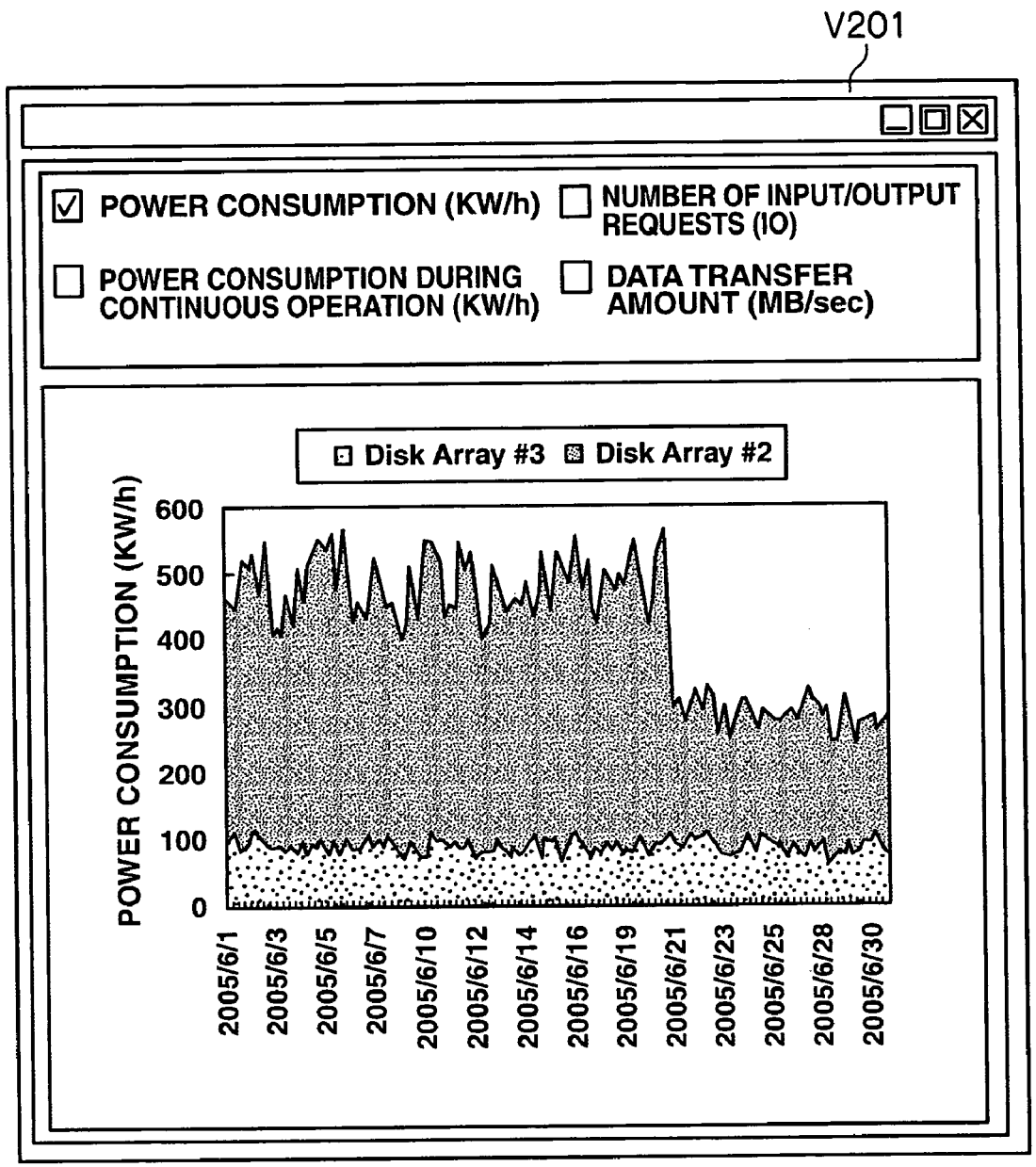
FIG. 22 is a schematic diagram indicating an example configuration for a management screen provided by a management computer.

FIG. 22 shows an example of chronological transition of the power consumption measurement value in units of storage systems 100 (disk arrays). The measurement period was set to be one month.

That screen is output when a plurality of storage systems 100 (disk array #2 and disk array #3) are selected in the left pane V102, and power consumption reporting is designated in the upper right pane V103.

The power consumption measurement value is calculated by adding the power consumption values stored in the respective corresponding power consumption column 31046 of the apparatus performance information 3104 retained by the management computer 300 shown in FIG. 11. According to the graph, power consumption values can be compared to see which apparatus consumes a large amount of power.

Figure 23:
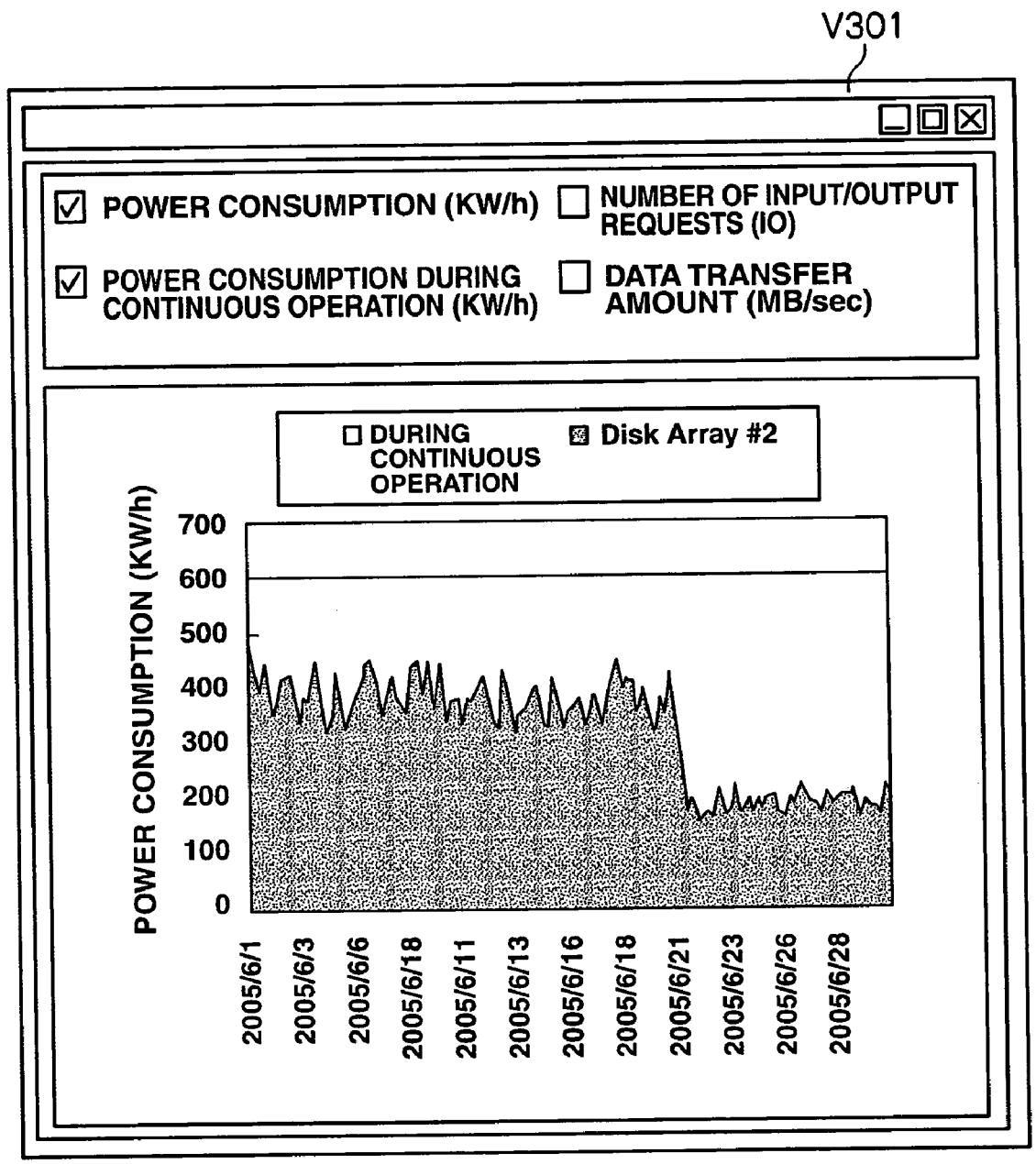
FIG. 23 is a schematic diagram indicating an example configuration for a management screen provided by a management computer.

FIG. 23 indicates the power consumption measurement value for the storage system 100 (Disk Array #2) being output together with its power consumption value during continuous operation. The power consumption during continuous operation can be calculated by adding the power specification values stored in the corresponding power specification column 31045 of the apparatus performance information 3104.

Power consumption can be reduced relative to that during continuous operation by halting some of the magnetic memory apparatuses 120. The graph enables calculation of the power consumption reduction effect. The difference between "power consumption during continuous operation" and "power consumption" corresponds to that reduction effect.

Figure 24:
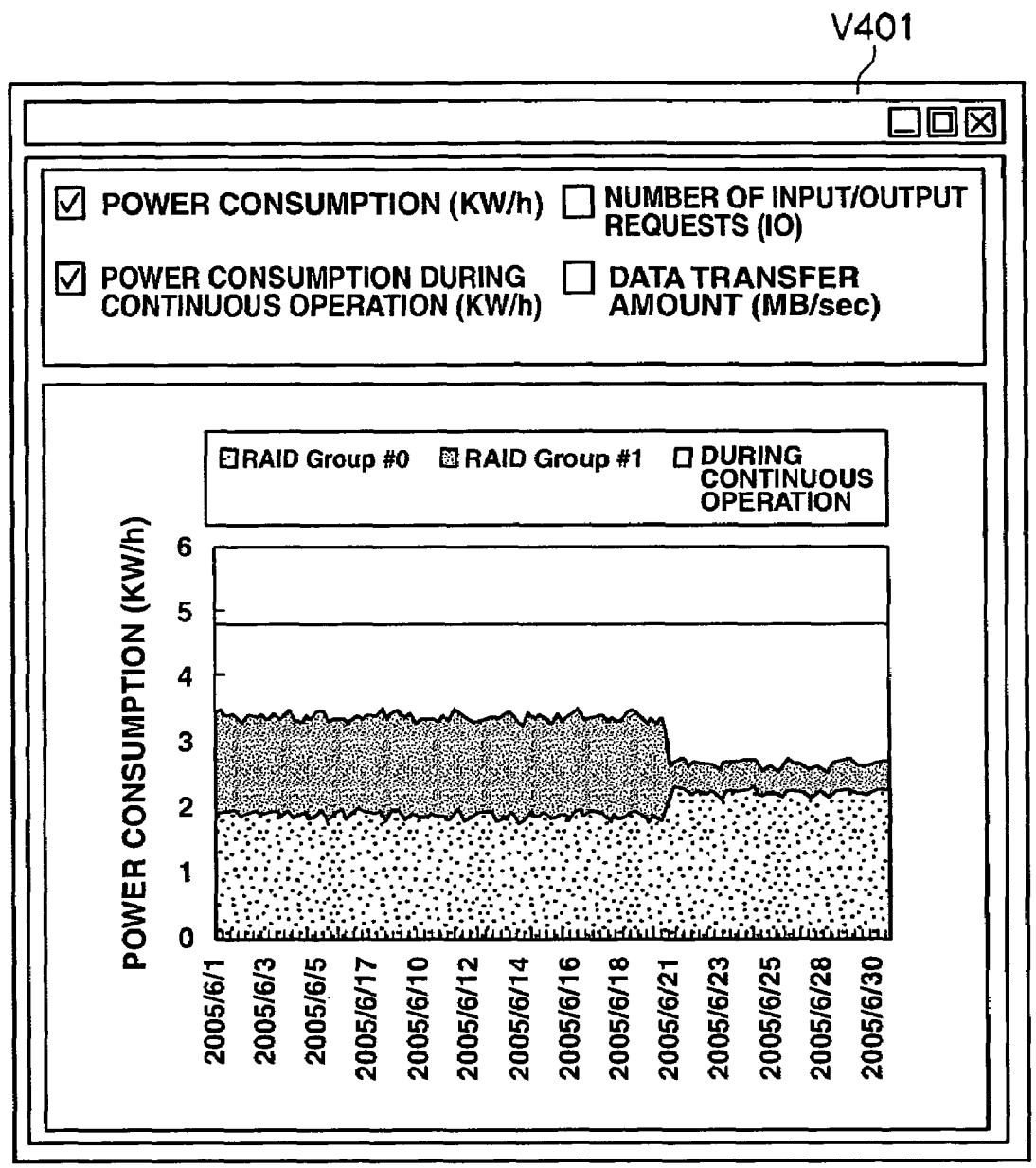
FIG. 24 is a schematic diagram indicating an example configuration for a management screen provided by a management computer.

FIG. 24 shows an example of power consumption measurement values and a power consumption value during continuous operation of a RAID group in a storage system 100 being output.

Figure 25:
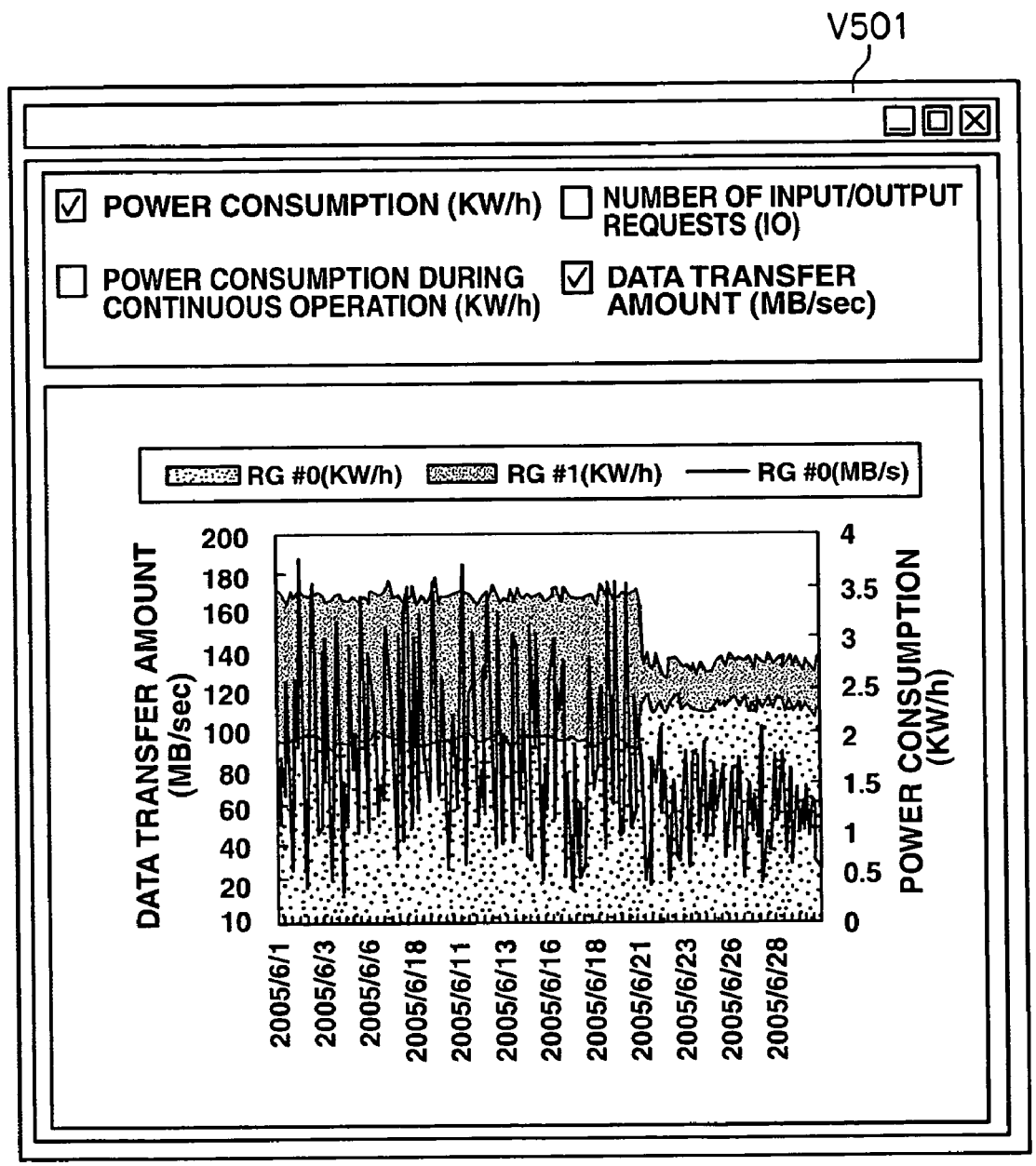
FIG. 25 is a schematic diagram indicating an example configuration for a management screen provided by a management computer.

FIG. 25 shows an example of the data transfer amount values sent/received by a RAID group being output together with the power consumption measurement values of the RAID group.

The data transfer amount corresponds to the value obtained by adding the data transfer amounts 310410 for the target RAID in the apparatus performance information 3104.

When an attempt is made to reduce power consumption by temporarily halting any magnetic memory apparatus 120, if there is an input/output request to the temporarily-halted magnetic memory apparatus 120, that memory apparatus 120 switches from a halted state to a continuous operating state, generating a delay until the input/output is performed. In other words, the power consumption reduction effect may also cause performance deterioration. Referring to the graph makes it possible to analyze the power consumption reduction effect, and also to know the performance deterioration status. For example, it is possible to find operational problems, such as performance substantially deteriorating while power consumption not being reduced as expected.

Figure 26:
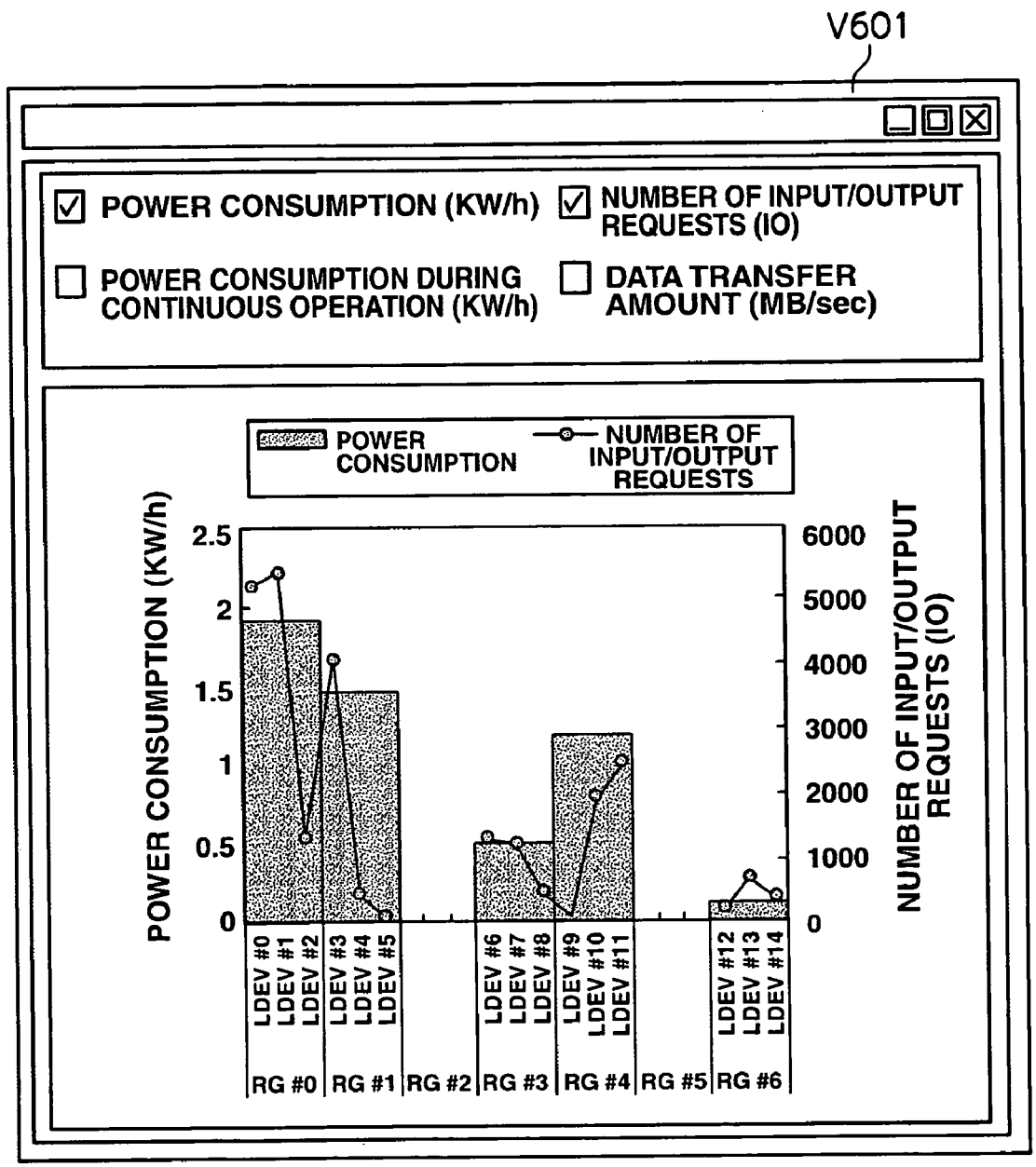
FIG. 26 is a schematic diagram indicating an example configuration for a management screen provided by a management computer.

FIG. 26 shows an example of outputting the power consumption value for each RAID group together with the number of input/output requests to the logical storage extents of that RAID group. The power consumption for a RAID group can be obtained by referring to the power consumption value stored in the power consumption column 31046 of the apparatus performance information 3104, and the number of input/output requests to a logical storage extent can be obtained by referring to the number of input/output requests stored in the input/output request count column 31049.

The graph shown in FIG. 26 can be used to examine the allocation of logical storage extents. For example, in the RAID group "RG#0," which consumes a large amount of power, the relatively-infrequently accessed logical storage extent "LDEV#2" is included. Meanwhile, the RAID group "RG#1" includes the frequently-accessed logical storage extent "LDEV#3." In this situation, it can be expected that logical storage extents with a high operation rate can be concentrated in the RAID group "RG#0," and also that logical storage extents with a low operation rate can be concentrated in the RAID group "RG#1" by interchanging the location of the logical storage extent "LDEV#2" and that of the logical storage extent "LDEV#3." As a result, the power consumption for the RAID group "RG#1" may be greatly reduced compared to the previous logical storage extent allocation.

The operation and function of the storage system 100 and the management computer 300 according to this embodiment is explained above. Now, using FIGS. 27 and 28, an example of power management for concentrating logical storage extents with a high operation rate in one or more RAID groups to reduce power consumption for the entire storage system 100 will be explained.

Figure 27:
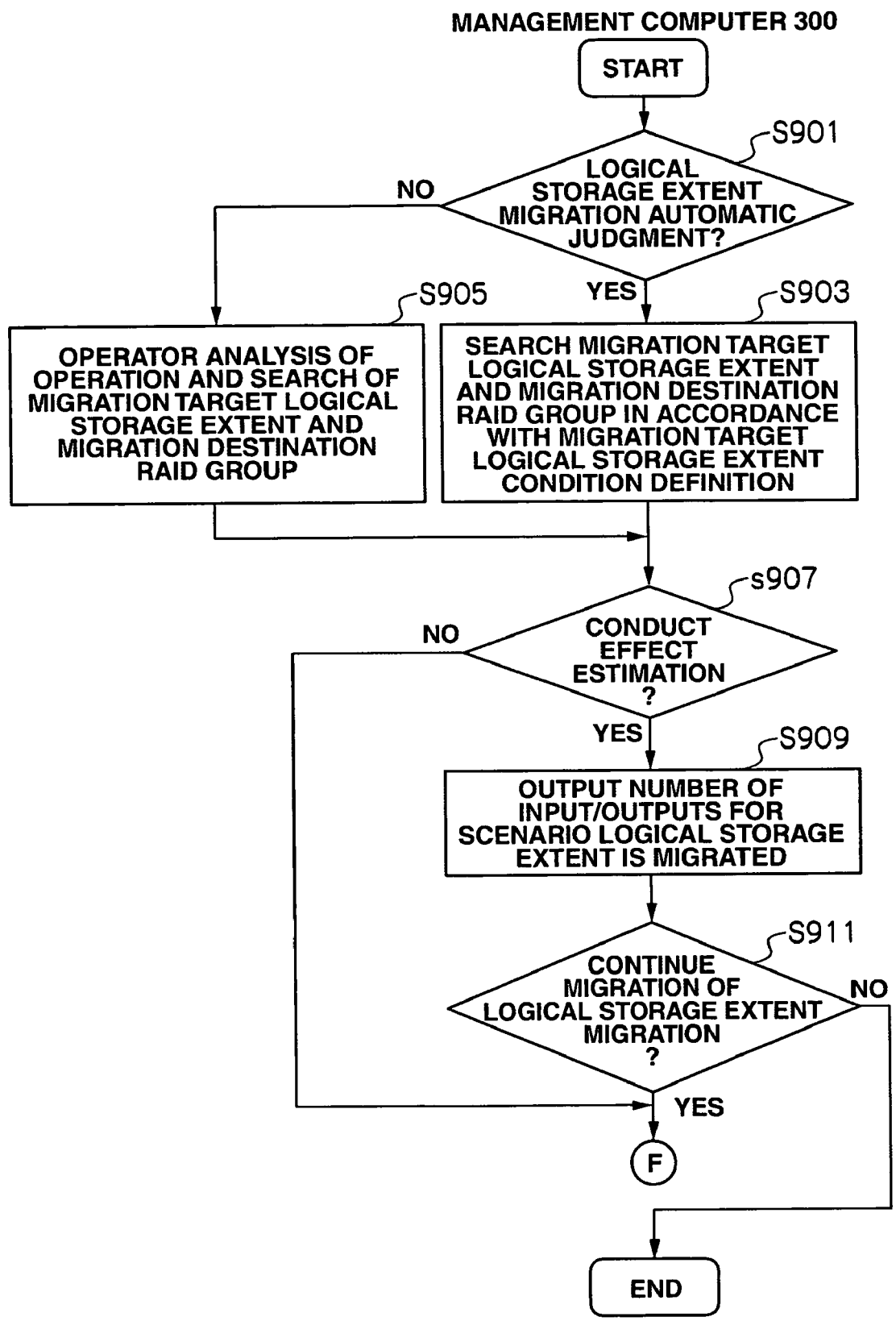
FIG. 27 is a flowchart indicating the procedure for processing for a power management operation in the management method according to an embodiment of the present invention.

In FIG. 27, the computing apparatus 360 of the management computer 300 first judges whether or not the judgment of whether there is any migration target logical storage extent is made automatically (S901). In other words, when considering the optimum storage extent allocation, there may be two cases where the judgment is automatically made by the management computer 300, and an operator makes the judgment considering the data output onto a management screen. Either case may be adopted.

As a result of step S901, the computing apparatus 360, in automatic judgment mode (S901: YES), in which the migration of a logical storage extent is automatically judged, proceeds to step S903. At step 903, the computing apparatus 360 uses data in the logical storage extent migration condition analysis information 3110 for the judgment criteria in the logical storage extent migration condition definition information 3108 in order to search and determine a migration target logical storage extent.

In the example shown in FIG. 17, the power consumption rate of the RAID group "RG#0" is "60 [%]," and in that RAID group, the input/output request concentration rate of the logical storage extent "LDEV#2" is calculated to be "10 [%]."

The above results conform to the judgment criteria of an input/output concentration rate of smaller than ("<") "15 [%]" and a power consumption rate of greater than (">") "55 [%]," which is the condition definition in the first row in the logical storage extent migration condition definition information 3108 shown in FIG. 16.

Concurrently, in FIG. 16, a power consumption of smaller ("<") than "55 [%]" is a condition for a migration destination RAID group. Thus, in the example shown in FIG. 17, the RAID group "RG#1" or the RAID group "RG#2" may be the migration destination. According to the above calculation, the logical storage extent "LDEV#2" satisfies the conditions for migration to the RAID group "RG#1."

In the same way, since the RAID group "RG#1" exhibits a power consumption rate of "50 [%]," and the logical storage extent "LDEV#3" exhibits an input/output concentration rate of "90.25 [%]," they conform to the conditions specified in the condition definition in the second row shown in FIG. 16. Furthermore, the RAID group "RG#0" exhibits a power consumption rate of "60 [%]," which satisfies the condition of greater than (">") "55 [%]" for the migration destination.

Based on the above results, the migration target logical storage extent and its migration destination RAID group are determined, the operations of "migrating the logical storage extent 'LDEV#2' to the RAID group 'RG#1,'" and "migrating the logical storage extent 'LDEV#3' to the RAID group 'RG#0'" are obtained as candidates (S903).

As a result of step S901, when automatic judgment mode is 'off,' and an operator judges the migration of logical storage extents (S901: NO), the computing apparatus 360 proceeds to step S905. Here, at step S905, the same operations as those obtained through the automatic judgment may be obtained as candidates by, for example, referring to the graph shown in FIG. 26. At step S905, further candidates may be obtained by the combined examination of FIG. 23 or FIG. 25. For example, more precise operation management may be possible, such as returning to the previous state in the case of significant performance deterioration shown in FIG. 25, or making the apparatus not subject to the operation in the case of sufficient power consumption reduction effect shown in FIG. 23.

Before applying the operation introduced at step S903 and step S905, if set to do so, whether or not the computing apparatus 360 should execute processing for estimating the effect of migrating data in the migration target logical storage extent to the RAID group determined as the migration destination may be judged by simulation (S907), and the computing apparatus 360 may perform effect estimating processing (S909). However, this step may also be omitted.

The computing apparatus 360, at this effect estimating step (S909), once again prepares logical storage extent operation information (from the logical storage extent operation information column 31047) in the apparatus performance information 3104 (FIG. 11) and logical storage extent operation information (from the logical storage extent operation information column 31106) in the apparatus performance analysis information 3110 for the scenario where the logical storage extent "LDEV#2" and the logical storage extent "LDEV#3" are interchanged in accordance with the above operation, and outputs information based on that information.

As it is impossible to simply estimate power consumption, in this embodiment, estimation is made with regard only to logical storage extent operation information, e.g., the number of inputs/outputs for each RAID group (or the corresponding RAID group only). In this case, when outputting a management screen, the graph for the number of input/output requests, which excludes power consumption information from the graph shown in FIG. 26, may be displayed. This makes it possible to examine in advance the bias of input/output requests for each RAID group after the application of the storage extent migration processing.

Then, the computing apparatus 360, as a result of step S909, judges whether or not to continue the processing for migrating the logical storage extent (S911), and if it does not continue, ends the series of processing here.

Meanwhile, when the computing apparatus 360, as a result of step S909, continues the processing for migrating the logical storage extent and the automatic judgment mode is 'on,' it sends a migration request according to the migration target logical storage extent and its migration destination RAID group determined at step S903 to the relevant storage system 100 (S913). When the computing apparatus 360 continues the logical storage extent migration processing and automatic judgment mode is 'off,' it sends a migration request according to the migration target logical storage extent and the migration destination RAID group input by the operator at step S905 to the relevant storage system 100 (S913). Here, it requests the migration of the logical storage extent "LDEV#2" to the RAID group "RG#1," and the logical storage extent "LDEV#3" to the RAID group "RG#0."

The storage system 100, upon receiving the request, performs the processing for migrating the logical storage extent (S915). The processing for migrating the logical storage extent is performed according to the procedure shown in FIG. 20.

Furthermore, the computing apparatus 360, after a certain analysis time period has passed subsequent to the migration processing, outputs a management screen or a report, shown in FIG. 22 to FIG. 26, in order to examine the power consumption reduction effect. The operator can review it to see the results such as power consumption reduction, input/output request bias, and performance deterioration, making it possible to re-examine the optimum location and perform relocation.

Figure 28:
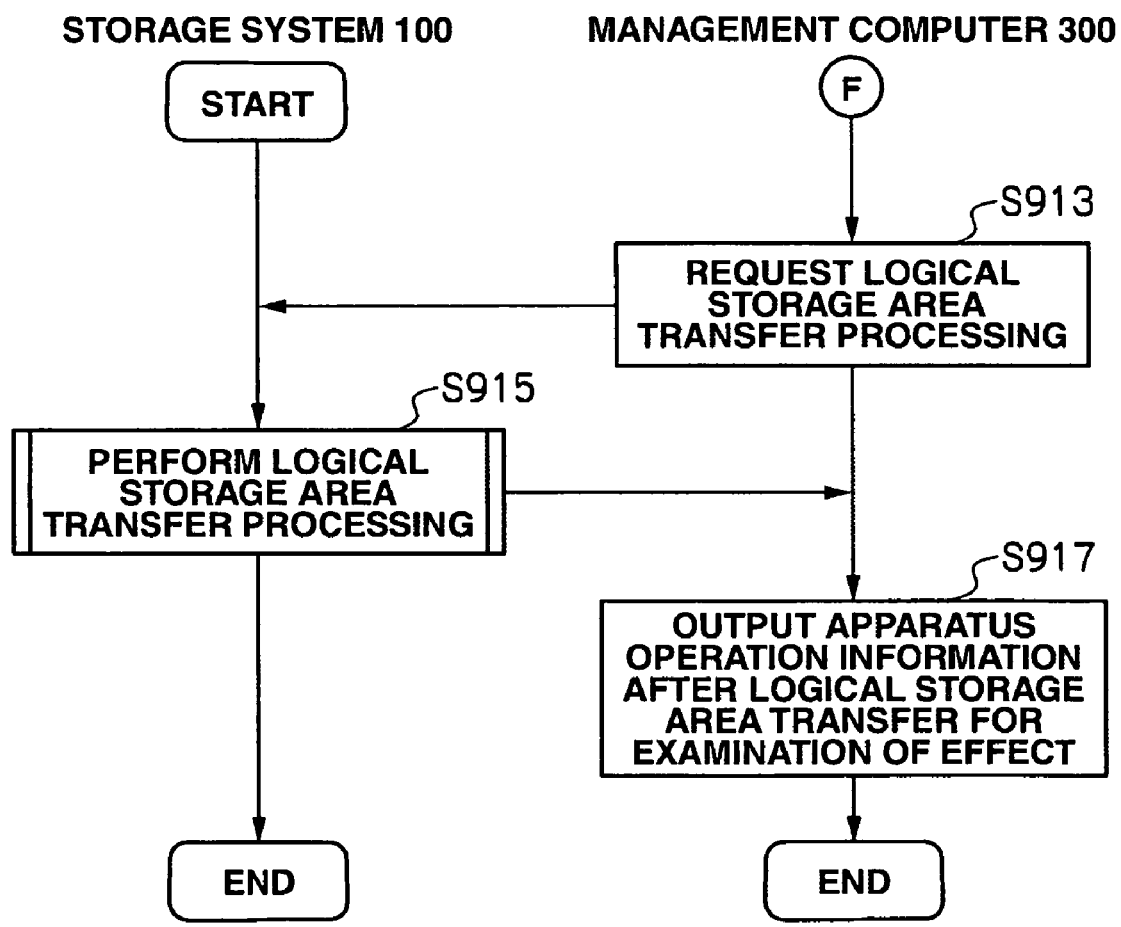
FIG. 28 is a flowchart indicating the procedure for processing for a power management operation in the management method according to an embodiment of the present invention.

FIGS. 27 and 28 indicate the judgment processing based on the number of input/output requests. However, of course, the other performance values, such as data transfer amount, or an operation rate can be used for judgment.

In that case, it is obviously possible according to the logical storage extent migration condition definition information 3108 of this embodiment to employ a decision dividing input/output requests among a plurality of magnetic memory apparatuses 120 (which improves performance) even though power consumption will increase, instead of concentrating input/output requests in some of the magnetic memory apparatuses 120 (which decreases performance) in order to reduce power consumption. This makes it possible to, for example, respond to, when the system operates within a limited budget and the upper limit of the power consumption is determined, a request to enhance performance to the maximum extent but not exceeding the upper limit.

The above configuration makes it possible to concentrate magnetic memory apparatuses consuming power into a particular portion, reducing the total power consumption for the storage system 100. Consequently, the configuration of the storage system 100 can be optimized. It is also possible to manage power consumption not only in the entire storage system 100, but also in more specific units of logical storage extents. Furthermore, it is possible to be aware of the relationship between power consumption and logical storage extents, and the relationship between power consumption and performance, making problem analysis or relocation easy. Moreover, the effect of migrating a logical storage extent can be estimated before the migration. The effect of reducing power consumption can be obtained by relocating a logical storage extent. Furthermore, optimization of the storage system 100 according to a user's judgment can easily be conducted by the management computer 300 outputting (visibly displaying) the access status information for each logical storage extent.

The above embodiment describes the case where the output interface 380, being an output unit for outputting the power consumption for each RAID group calculated by the computing apparatus 360, being a computing unit of the management computer 300, together with the number of inputs/outputs for each logical area, is comprised of a general-purpose display. However, the present invention is not limited to the above case. The output interface 380 may be comprised of a printer or the like, so in other words, any other device that can visibly display necessary information can be used.

Also, this embodiment describes the case where the output interface 380, being the output unit, outputs the power consumption for each RAID group together with the number of input/output requests for each logical storage extent. However, the present invention is not limited to the above case. Any information enabling confirmation of the access status for the RAID group, such as the number of inputs/outputs per unit of time, or an average per unit of time of the number of input/output requests, rather than the total number of input/output requests, can be used.

The present invention can be applied to a network system using a RAID storage system as a memory apparatus.

What is claimed is:

1. A management apparatus for managing one or more storage systems having a plurality of storage devices that forms RAID groups and logical storage extents, the management apparatus comprising:
    a processing unit;
    a communication interface connected to the processing unit; and
    a user interface connected to the processing unit,
    wherein the processing unit collects first actual performance information and configuration information from the one or more storage systems via the communication interface, the first actual performance information contains an operation rate per a predetermined period of time for each storage device, the configuration information contains storage device power consumption specifications for each storage device,
    wherein the processing unit computes actual power consumption for each of the RAID groups based on the operation rate of the first actual performance information and the storage device power consumption specifications of the configuration information,
    wherein the processing unit collects second actual performance information from the one or more storage systems via the communication interface, the second actual performance information contains a number of I/O requests per the predetermined period of time for each of the logical storage extents and a data transfer amount per unit time for said each logical storage extent, and
    wherein the processing unit generates output signals to display the actual power consumption together with the second actual performance information on the user interface.

2. The management apparatus according to claim 1, wherein the processing unit determines a source logical storage extent from among the logical storage extents and a destination RAID group from among the RAID groups based on the actual power consumption and the second actual performance information.

3. The management system according to claim 2, wherein the processing unit determines the source logical storage extent and the destination RAID group based on an input/output concentration ratio of a relevant logical storage extent among the logical storage extents and an average per unit time data transfer amount for the relevant logical storage extent.

4. The management apparatus according to claim 2, wherein the processing unit computes, based on the second actual performance information, expected performance information for the destination RAID group for a scenario where the source logical storage extent is migrated to the destination RAID group, and generates output signals to display the expected performance information on the user interface.

5. The management apparatus according to claim 4, wherein the processing unit computes the actual power consumption based on the first actual performance information and the configuration information that are collected after the source logical storage extent is migrated to the destination RAID group.

6. The management apparatus according to claim 2, wherein the processing unit transmits a request for migration to a corresponding storage system that has the destination RAID group.

7. A management method for managing one or more storage systems having a plurality of storage devices that forms RAID groups and logical storage extents, the management apparatus including a processing unit, a communication interface connected to the processing unit and a user interface connected to the processing unit, the method comprising:
    collecting first actual performance information and configuration information from the one or more storage systems via the communication interface, the first actual performance information containing an operation rate per a predetermined period of time for each storage device, the configuration information containing storage device power consumption specifications for each storage device;
    computing actual power consumption for each of the RAID groups based on the operation rate of the first actual performance information and the storage device power consumption specifications of the configuration information;
    collecting second actual performance information from the one or more storage systems via the communication interface, the second actual performance information containing a number of I/O requests per the predetermined period of time for each of the logical storage extents and a data transfer amount per unit time for said each logical storage extent; and
    generating output signals to display the actual power consumption together with the second actual performance information on the user interface.

8. The management method according to claim 7, further comprising determining a source logical storage extent from among the logical storage extents and a destination RAID group from among the RAID groups based on the actual power consumption and the second actual performance information.

9. The management method according to claim 8, further comprising computing, based on the second actual performance information, expected performance information for the destination RAID group for a scenario where the source logical storage extent is migrated to the destination RAID group, and generates output signals to display the expected performance information on the user interface.

10. The management method according to claim 9, further comprising computing the actual power consumption based on the first actual performance information and the configuration information that are collected after the source logical storage extent is migrated to the destination RAID group.

11. The management method according to claim 8, further comprising transmitting a request for migration to a corresponding storage system that has the destination RAID group.

12. A storage management system comprising:

with one or more storage systems having a plurality of storage devices that forms RAID groups and logical storage extents, and a management apparatus for managing the one or more storage systems, wherein each of the one or more storage systems includes a controller for reading/writing data provided by a host system from/to a relevant logical storage extent among the logical storage extents provided by the plurality of storage devices, and transmitting information based upon a performance and capacity of each of the logical storage extents, wherein the management apparatus includes a processing unit, a communication interface connected to the processing unit, and a user interface connected to the processing unit, the processing unit collects first actual performance information and configuration information from the one or more storage systems via the communication interface, the first actual performance information contains an operation rate per a predetermined period of time for each storage device, the configuration information contains storage device power consumption specifications for each storage device, the processing unit computes actual power consumption for each of the RAID groups based on the operation rate of the first actual performance information and the storage device power consumption specifications of the configuration information, the processing unit collects second actual performance information from the one or more storage systems via the communication interface, the second actual performance information contains a number of I/O requests per the predetermined period of time for said each logical storage extent and a data transfer amount per unit time for said each logical storage extent, the processing unit determines a Source logical storage extent from among the logical storage extents and a destination RAID group from among the RAID groups based on the actual power consumption, the processing unit transmits a request for migration to a corresponding storage system that has the destination RAID group, the processing unit generates output signals to display the actual power consumption together with the second actual performance information on the user interface, and wherein the controller of the corresponding storage system that has the destination RAID group migrates the determined source storage extent to the determined destination RAID group in accordance with the request for migration processing received from the management apparatus.

13. The storage management system according to claim 12, wherein the processing unit of the management apparatus determines the source logical storage extent and the destination RAID group based on not only the actual power consumption but also the second actual performance information.

* * * * *